US008780672B2

(12) United States Patent
Huhta et al.

(10) Patent No.: US 8,780,672 B2
(45) Date of Patent: *Jul. 15, 2014

(54) MULTI-FREQUENCY, MULTI-BEAM ACOUSTIC DOPPLER SYSTEM WITH CONCURRENT PROCESSING

(75) Inventors: Craig Huhta, Fort Collins, CO (US); Ramon Cabrera, Miami, FL (US); Zhivko Grozev, San Diego, CA (US); Alexander Kovachev, San Diego, CA (US); John Sloat, Chula Vista, CA (US); Daryl B. Slocum, La Mesa, CA (US)

(73) Assignee: YSI Incorporated, Yellow Springs, OH (US)

( * ) Notice: Subject to any disclaimer, the term of this patent is extended or adjusted under 35 U.S.C. 154(b) by 346 days.

This patent is subject to a terminal disclaimer.

(21) Appl. No.: 12/890,505

(22) Filed: Sep. 24, 2010

(65) Prior Publication Data

US 2011/0075518 A1 Mar. 31, 2011

Related U.S. Application Data

(63) Continuation-in-part of application No. 12/639,989, filed on Dec. 16, 2009, and a continuation-in-part of application No. 12/340,315, filed on Dec. 19, 2008, now Pat. No. 8,125,849.

(60) Provisional application No. 61/162,651, filed on Mar. 23, 2009.

(51) Int. Cl.
*G01S 15/00* (2006.01)
*G01S 15/58* (2006.01)

(52) U.S. Cl.
CPC .................................. *G01S 15/58* (2013.01)
USPC .......................................................... 367/90

(58) Field of Classification Search
USPC .......................................................... 367/90
See application file for complete search history.

(56) References Cited

U.S. PATENT DOCUMENTS

| 5,077,700 A | * | 12/1991 | Shaw et al. ............... 367/91 |
| 5,088,859 A | | 2/1992 | Devlin |
| 5,208,785 A | * | 5/1993 | Brumley et al. ........... 367/90 |

(Continued)

*Primary Examiner* — Isam Alsomiri
*Assistant Examiner* — James Hulka
(74) *Attorney, Agent, or Firm* — Peter K. Hahn; Pillsbury Winthrop Shaw Pittman LLP

(57) ABSTRACT

An acoustic Doppler system comprising a plurality of acoustic transceivers, an acoustic subsystem controller and a main processing unit operatively connected to the acoustic subsystem controller. A first of the plurality of acoustic transceivers operates at a first acoustic frequency and is operatively connected to a first group of transducers producing an acoustic signal. A second of the plurality of acoustic transceivers operates at a second acoustic frequency and is operatively connected to a second group of transducers producing an acoustic signal. The first and second acoustic transceivers are adapted to operate concurrently at the first and second acoustic frequencies. The acoustic subsystem controller is operatively connected to the first and second acoustic transceivers and controls the acoustic signals produced by the first and second group of transducers. The main processing unit is adapted to execute instructions to the first and second group of transducers to produce acoustic signals having at least two frequencies and is adapted to run at least two processing methods concurrently. The main processing unit analyzes data received by the first and second group of transducers, automatically adjusts the acoustic frequencies of the acoustic signals produced by the first and second group of transducers, and automatically selects a method of processing the data received by the first and second group of transducers.

21 Claims, 27 Drawing Sheets

(56) References Cited

U.S. PATENT DOCUMENTS

| | | | |
|---|---|---|---|
| 5,315,562 A * | 5/1994 | Bradley et al. | 367/89 |
| 5,465,622 A * | 11/1995 | Freking | 73/597 |
| 5,615,173 A * | 3/1997 | Brumley et al. | 367/90 |
| RE35,535 E * | 6/1997 | Brumley et al. | 367/90 |
| 5,777,892 A * | 7/1998 | Nabity et al. | 702/143 |
| 5,952,583 A * | 9/1999 | Chang | 73/861.18 |
| 6,052,334 A * | 4/2000 | Brumley et al. | 367/90 |
| 6,097,671 A | 8/2000 | Merewether | |
| 6,453,256 B1 | 9/2002 | Gordon et al. | |
| 6,590,831 B1 * | 7/2003 | Bennett et al. | 367/16 |
| 6,714,482 B2 | 3/2004 | Rowe | |
| 6,741,209 B2 * | 5/2004 | Lee | 342/463 |
| 6,820,008 B1 * | 11/2004 | van Smirren et al. | 702/2 |
| 6,983,208 B2 * | 1/2006 | Metcalf et al. | 702/45 |
| 7,007,555 B2 | 3/2006 | Strong et al. | |
| 7,267,013 B2 * | 9/2007 | Maier | 73/861.23 |
| 7,523,658 B1 * | 4/2009 | Polonichko et al. | 73/170.13 |
| 7,539,082 B2 | 5/2009 | Vogt | |
| 8,125,849 B2 * | 2/2012 | Cabrera et al. | 367/90 |
| 2003/0076742 A1 * | 4/2003 | Rowe | 367/89 |
| 2008/0080313 A1 | 4/2008 | Brumley et al. | |
| 2008/0080315 A1 | 4/2008 | Vogt | |
| 2008/0094940 A1 * | 4/2008 | Brumley et al. | 367/90 |
| 2008/0156577 A1 * | 7/2008 | Dietz et al. | 181/176 |
| 2008/0239869 A1 * | 10/2008 | Lohrmann et al. | 367/3 |
| 2008/0289433 A1 | 11/2008 | Lohrmann et al. | |
| 2008/0308343 A1 | 12/2008 | Vogt | |
| 2010/0142324 A1 | 6/2010 | Vogt | |
| 2010/0154561 A1 * | 6/2010 | Cabrera et al. | 73/861.25 |
| 2010/0157739 A1 * | 6/2010 | Slocum et al. | 367/131 |

* cited by examiner

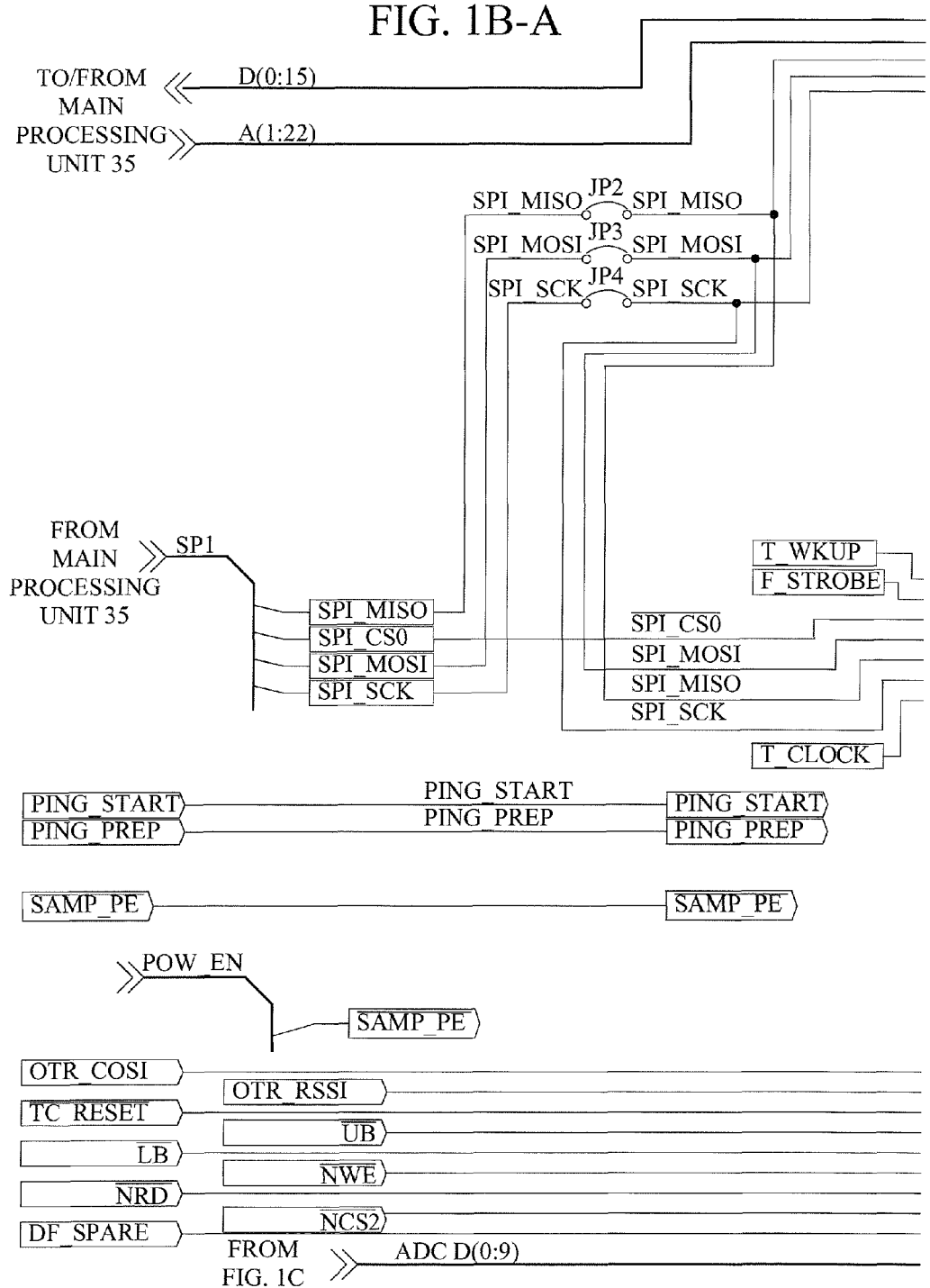
FIG. 1B-A

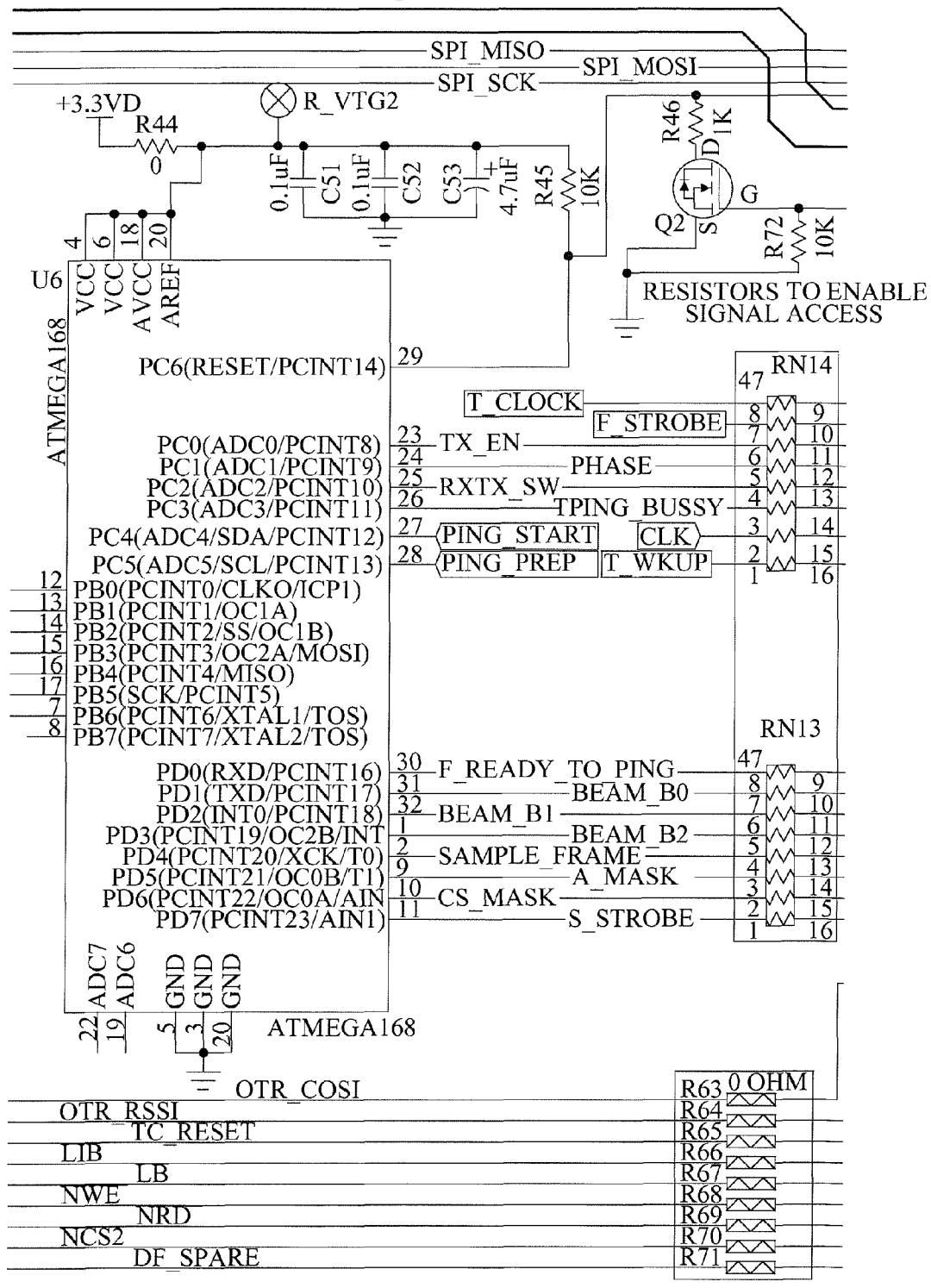
FIG. 1B-B

FIG. 1B-C
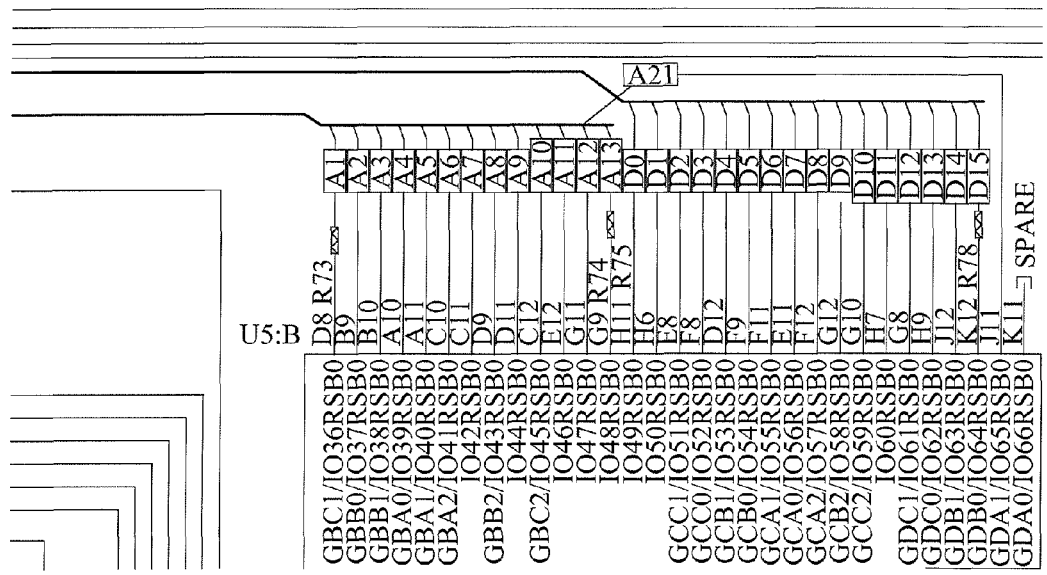

FIG. 1B-D
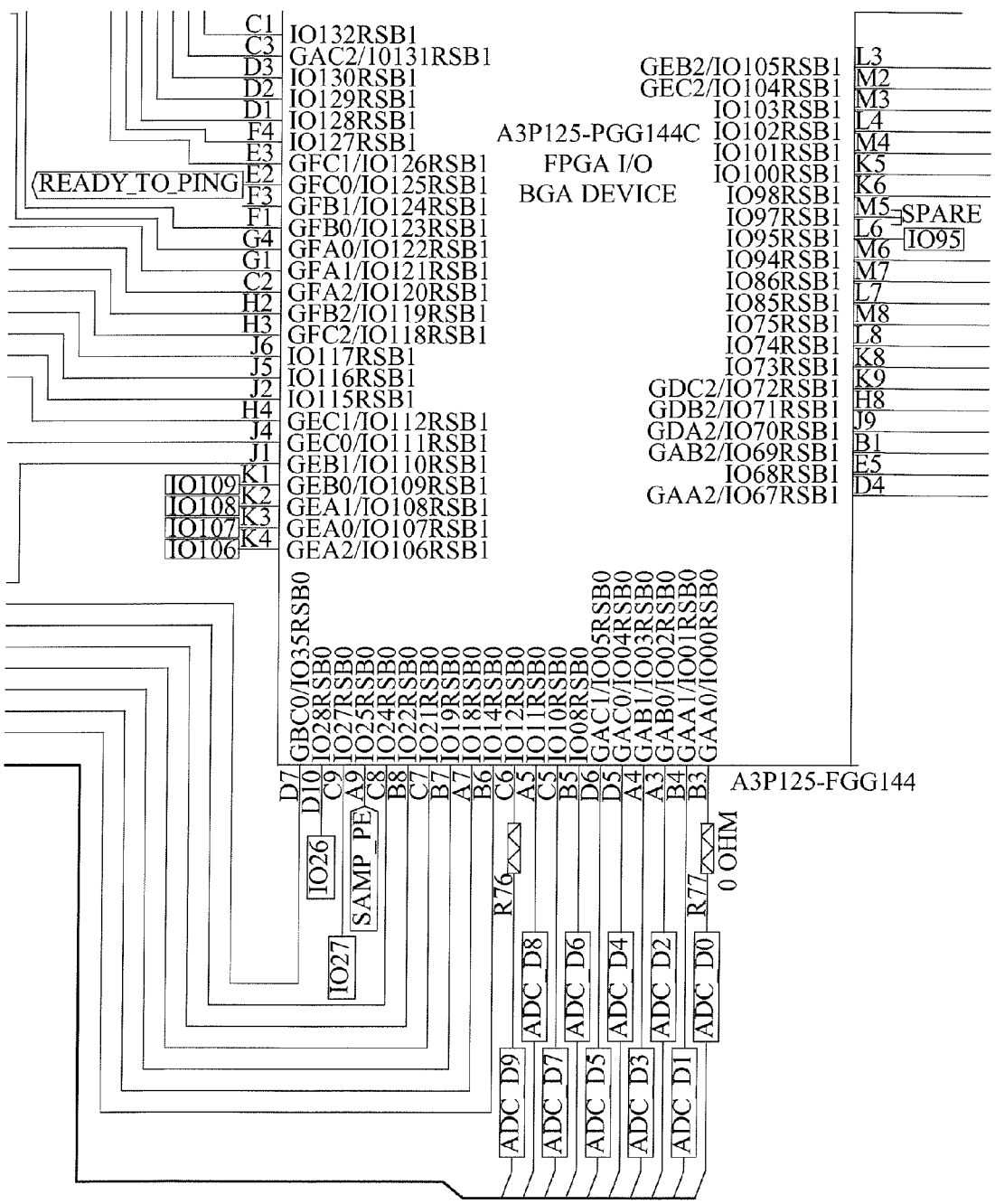

FIG. 1B-E
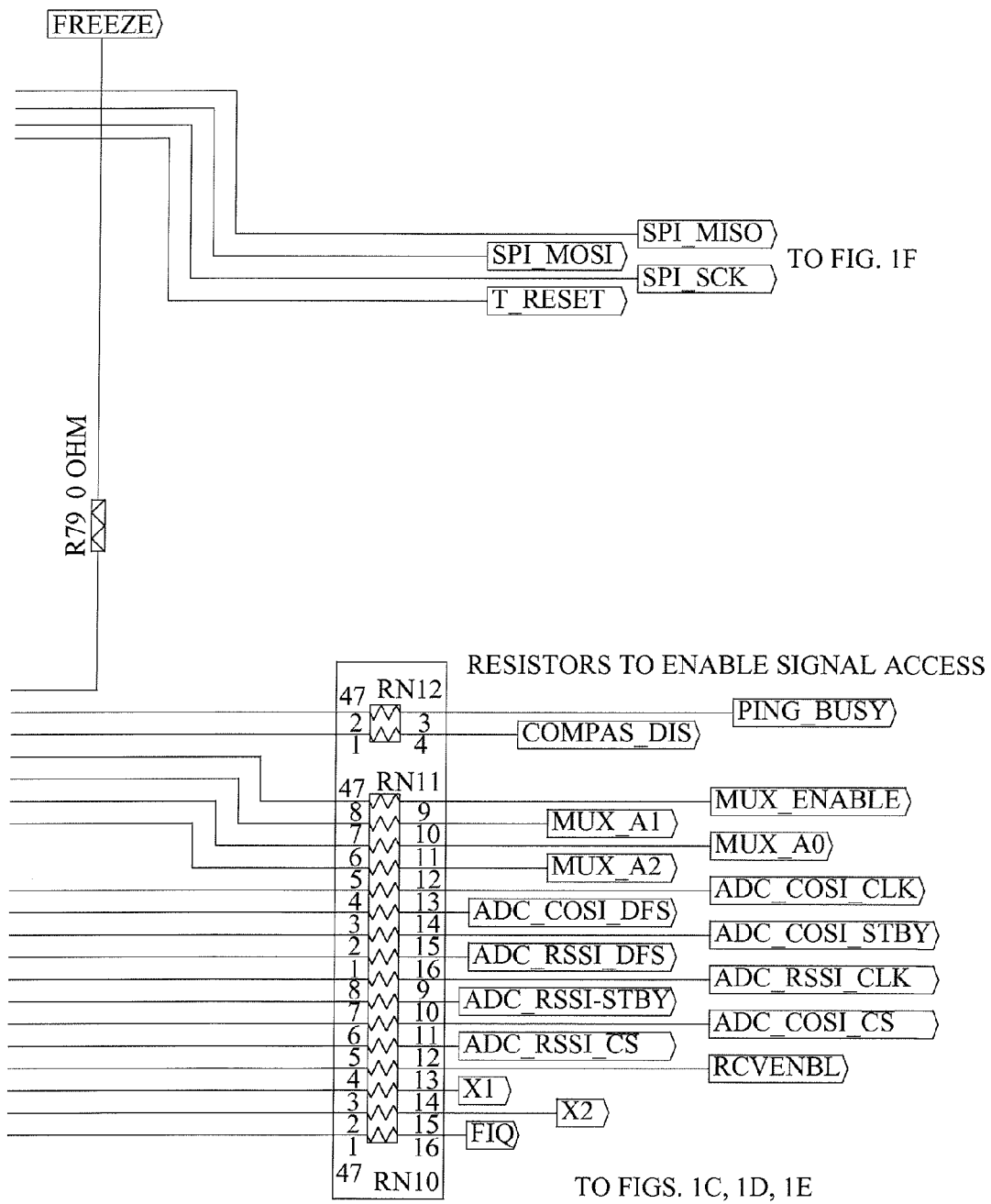

FIG. 1C-A
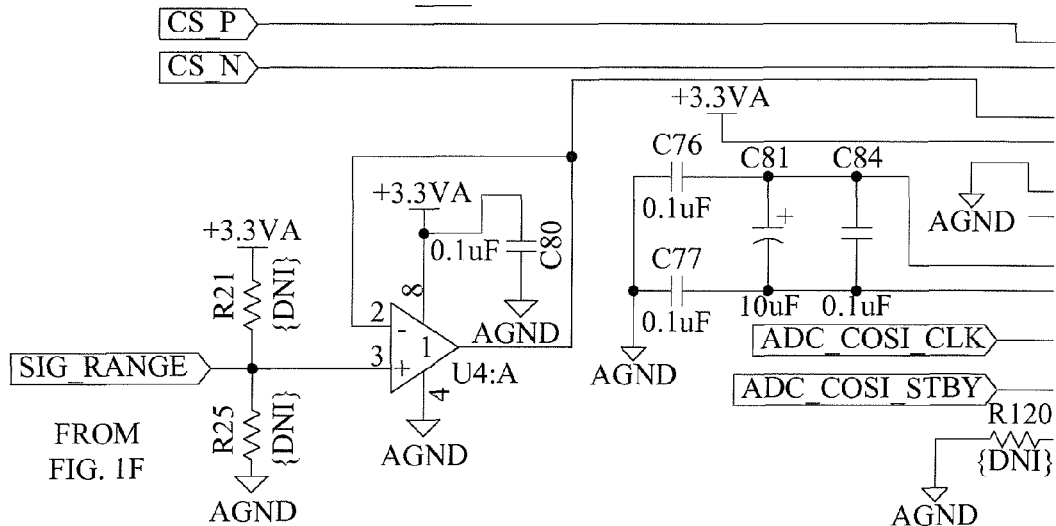
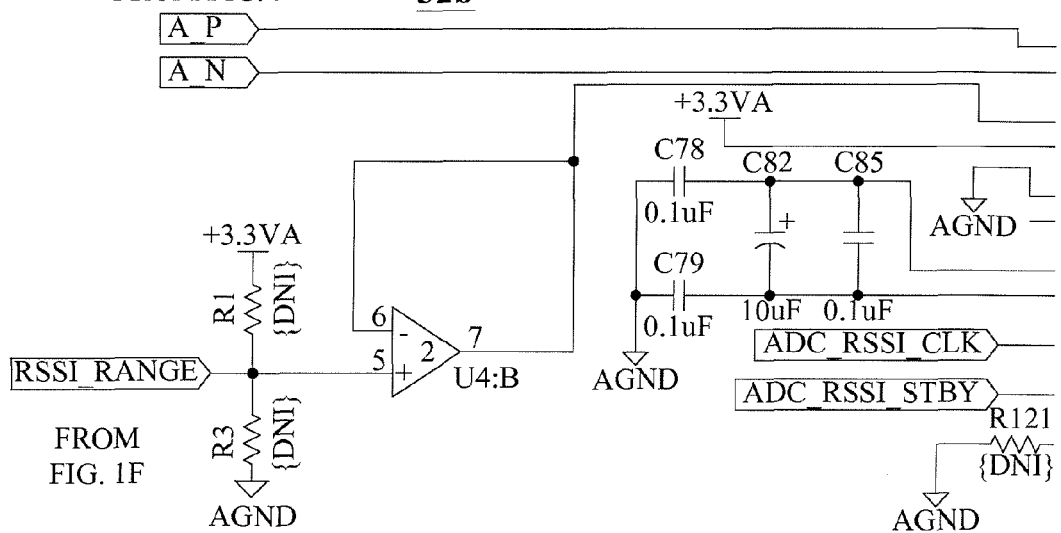

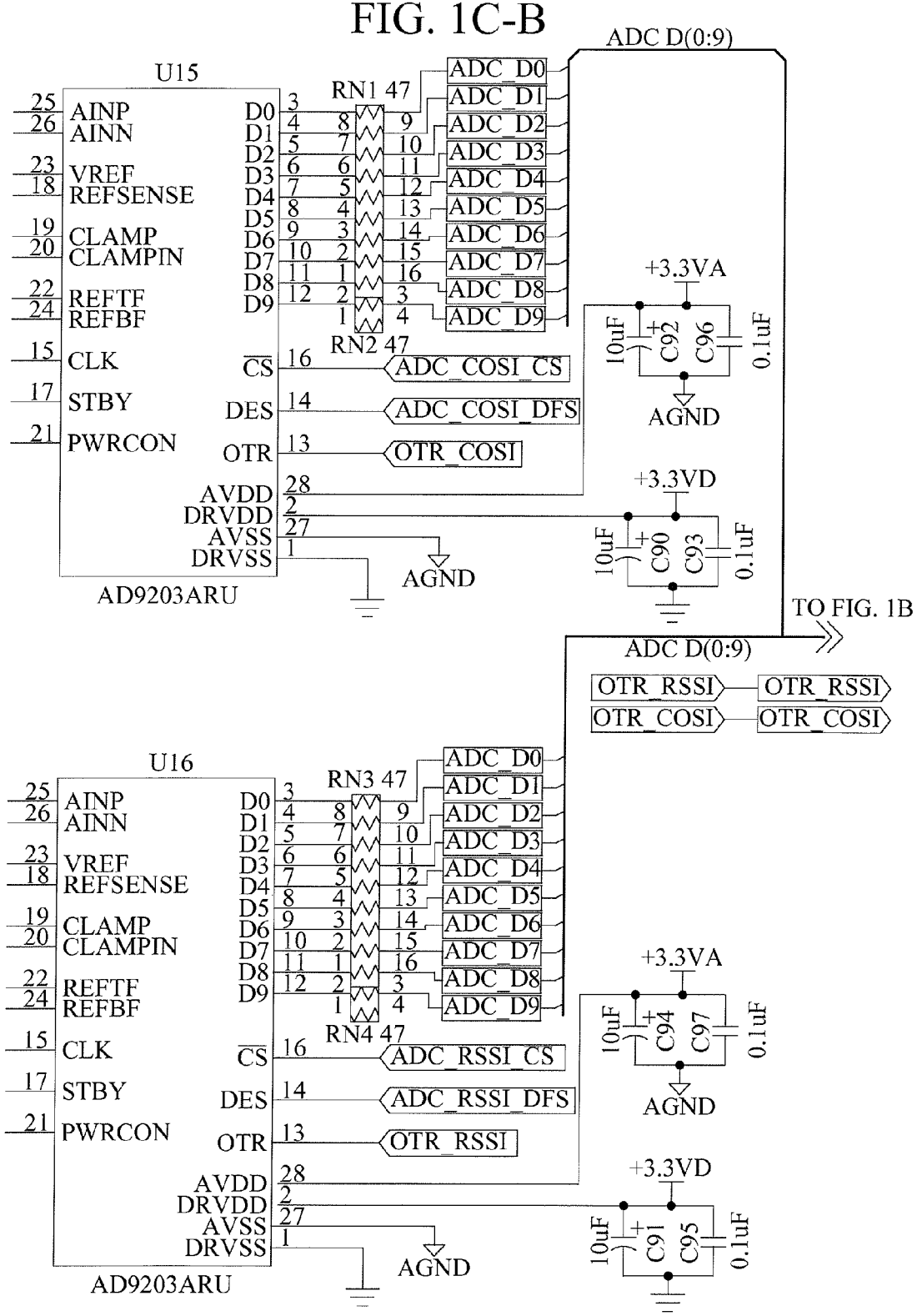
FIG. 1C-B

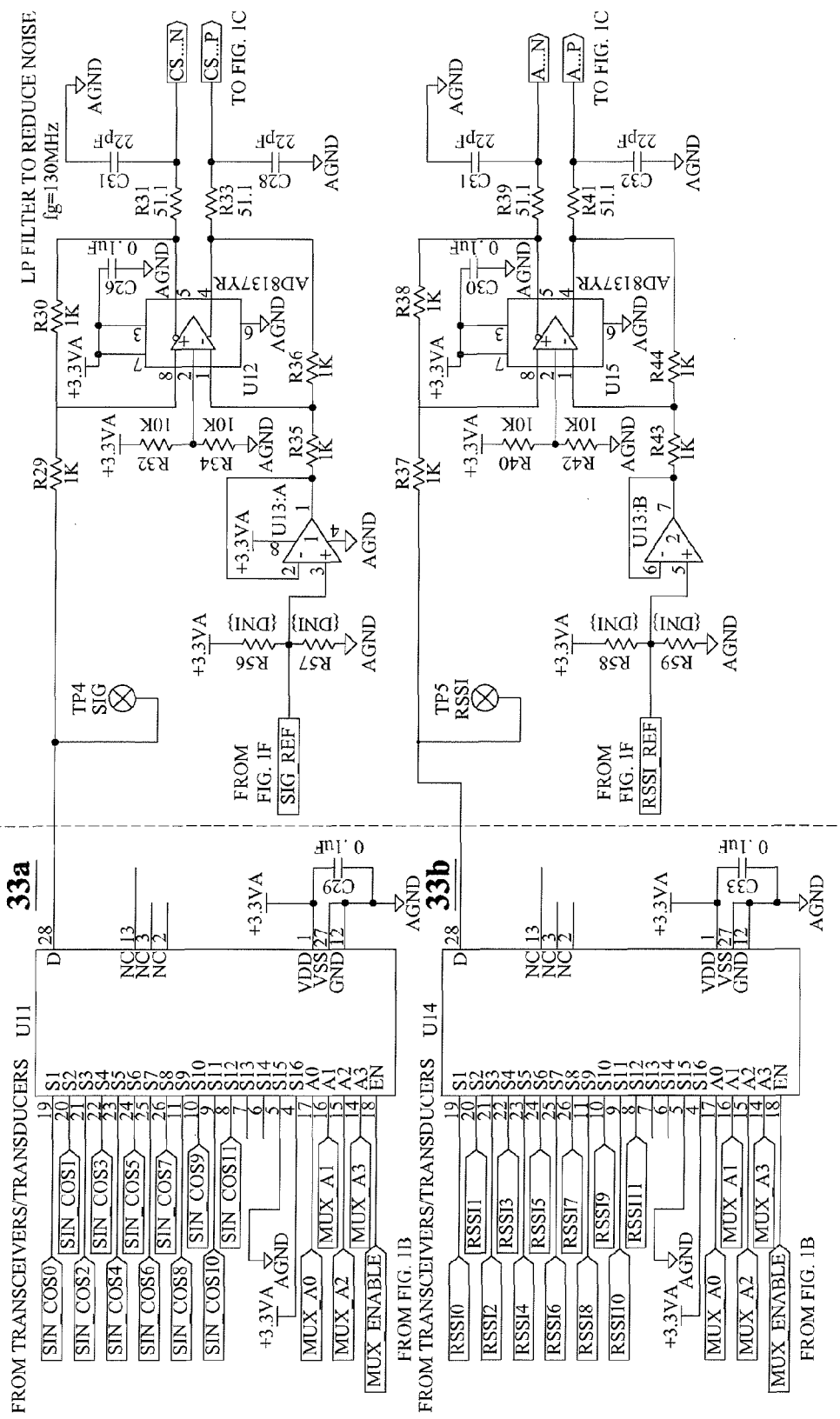

FIG. 1D-A
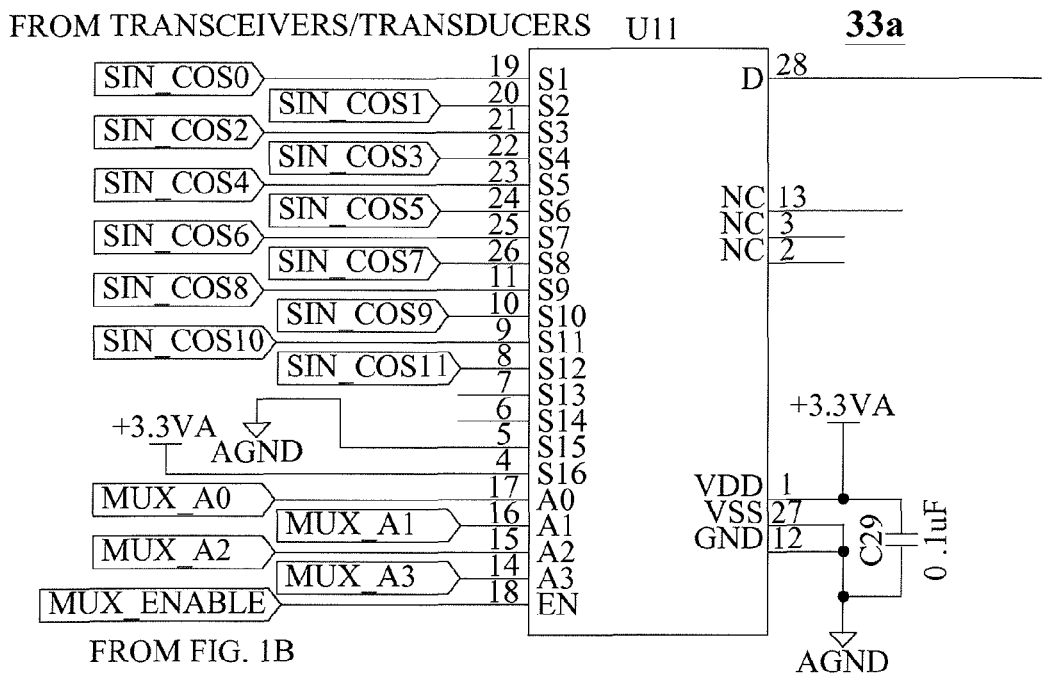
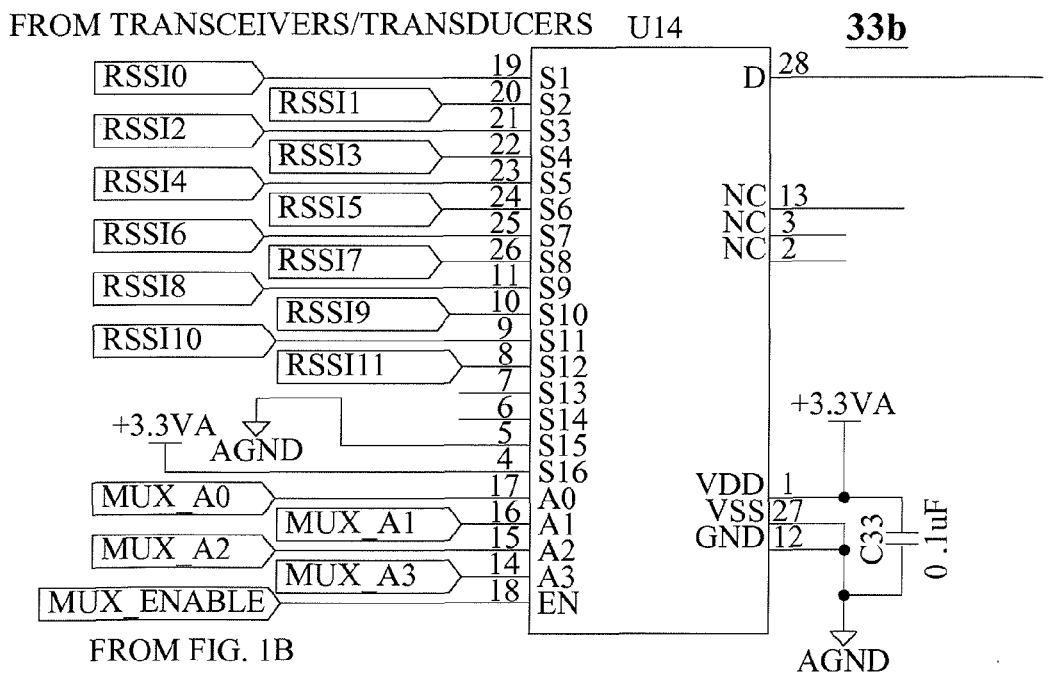

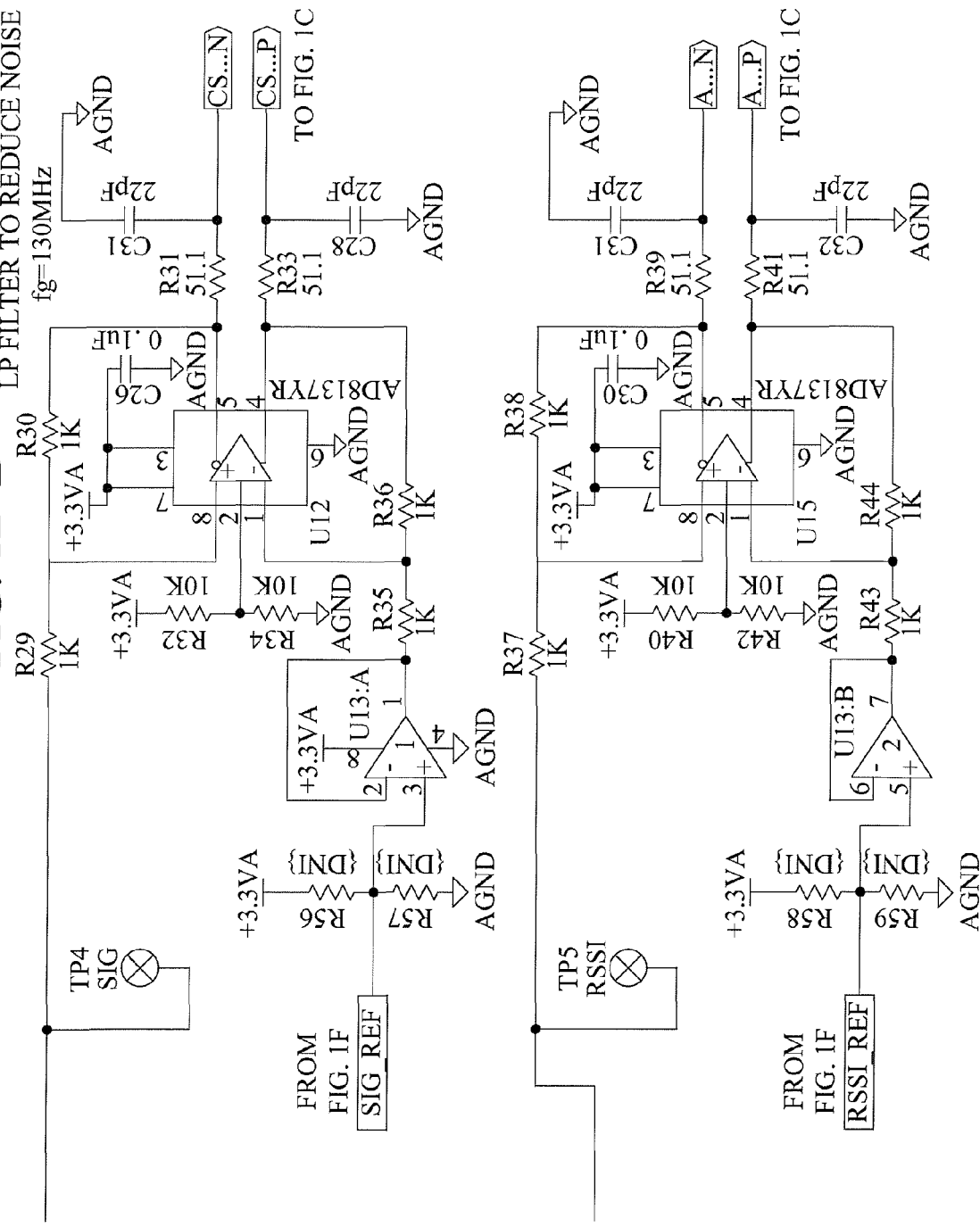
FIG. 1D-B

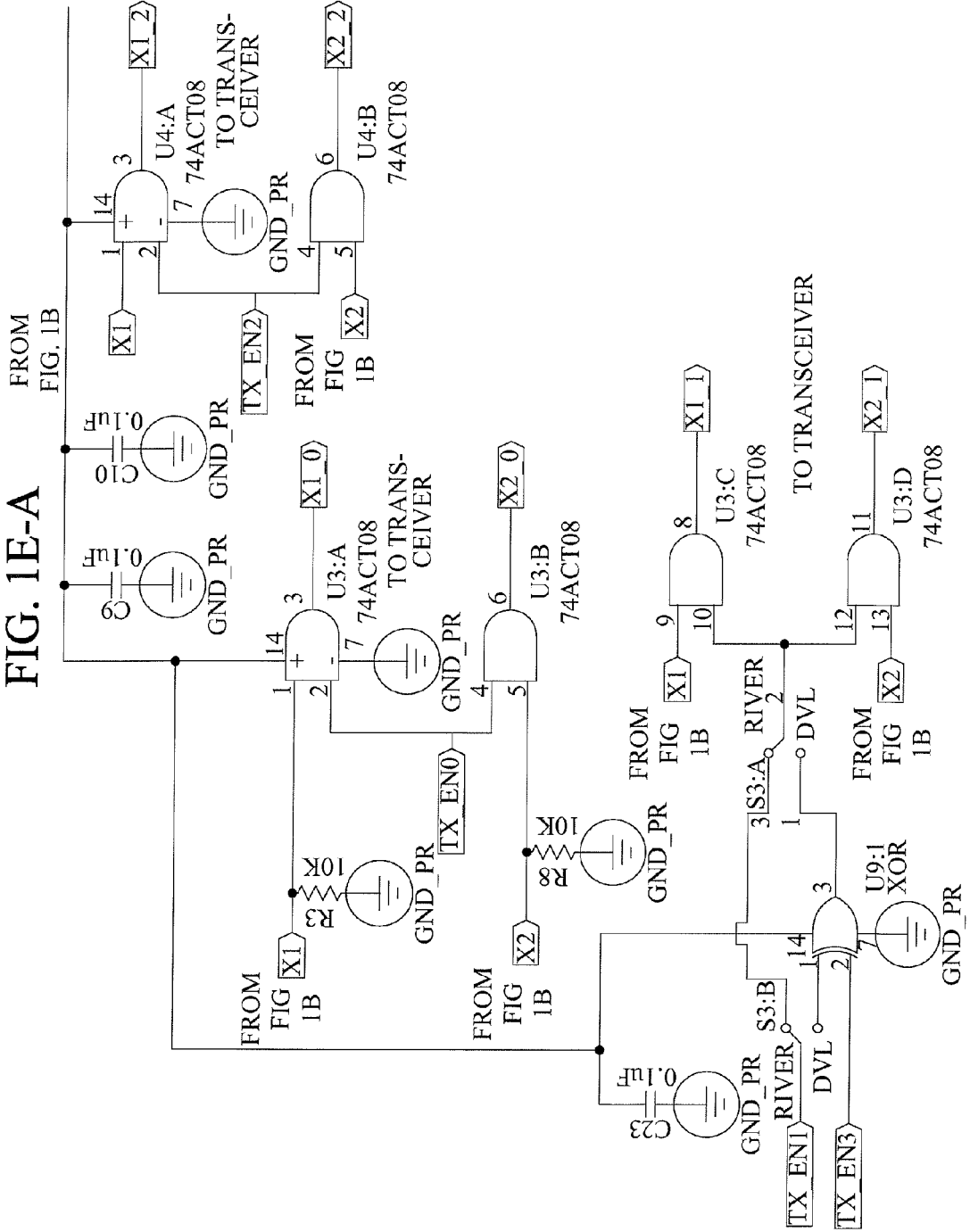
FIG. 1E-A

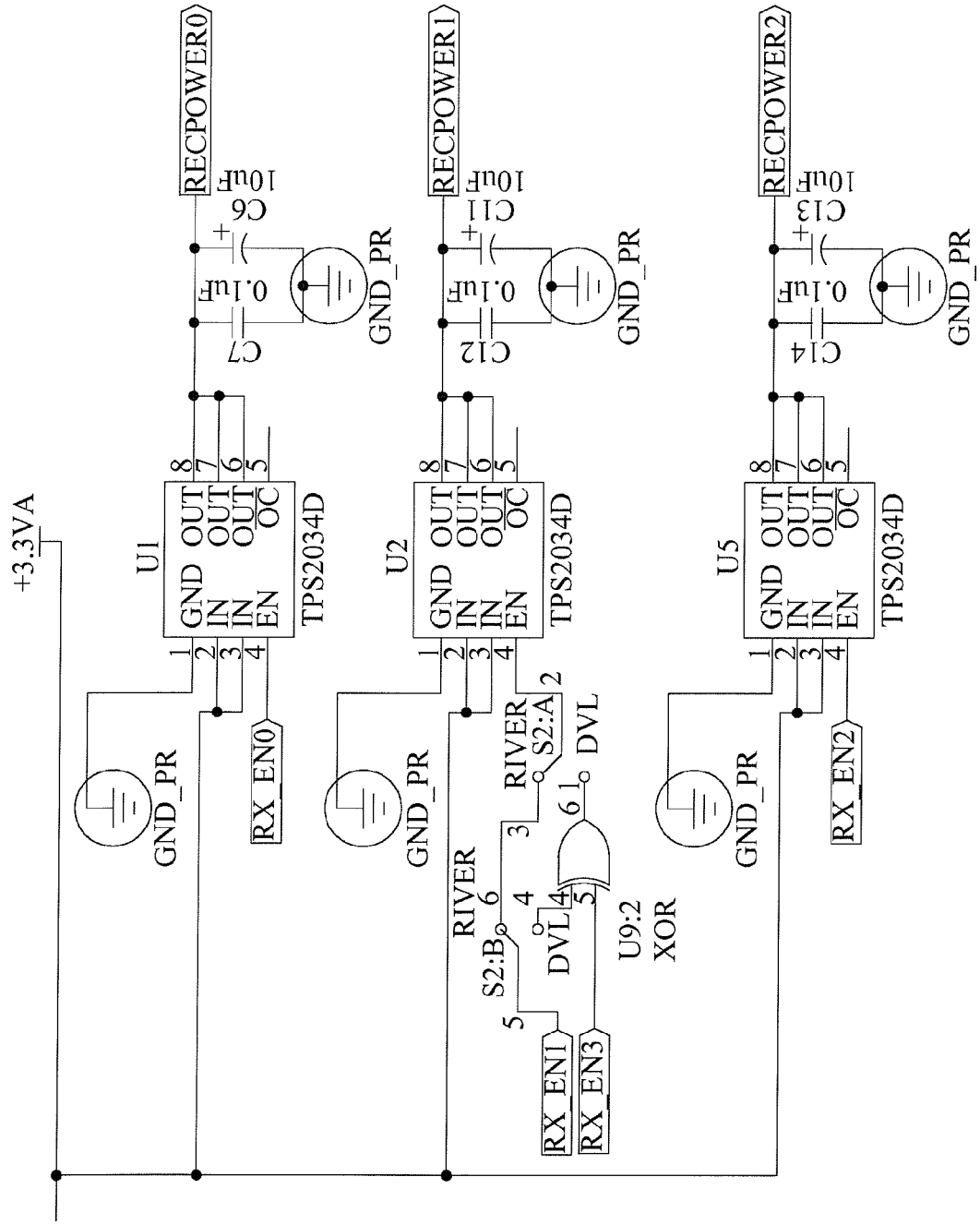
FIG. 1E-B

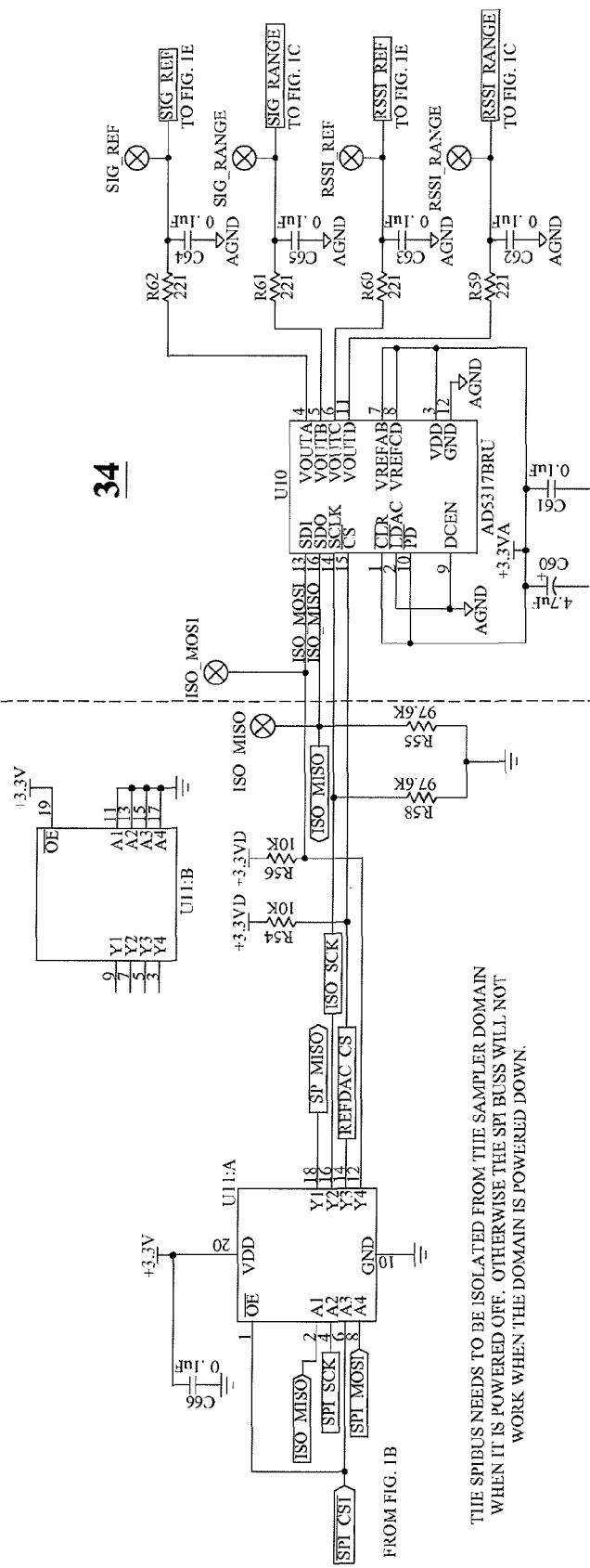

FIG. 1F-A
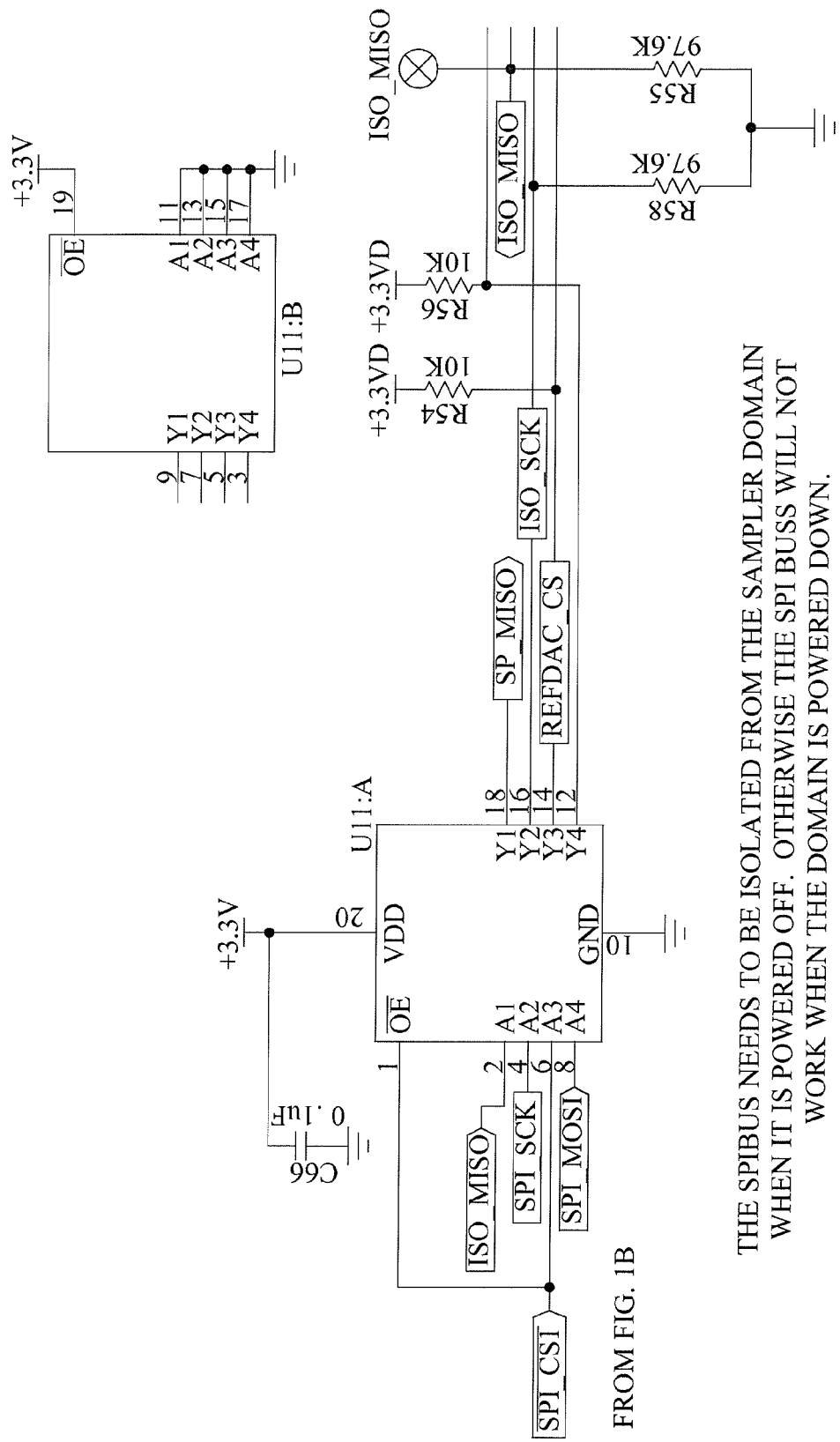

FIG. 1F-B
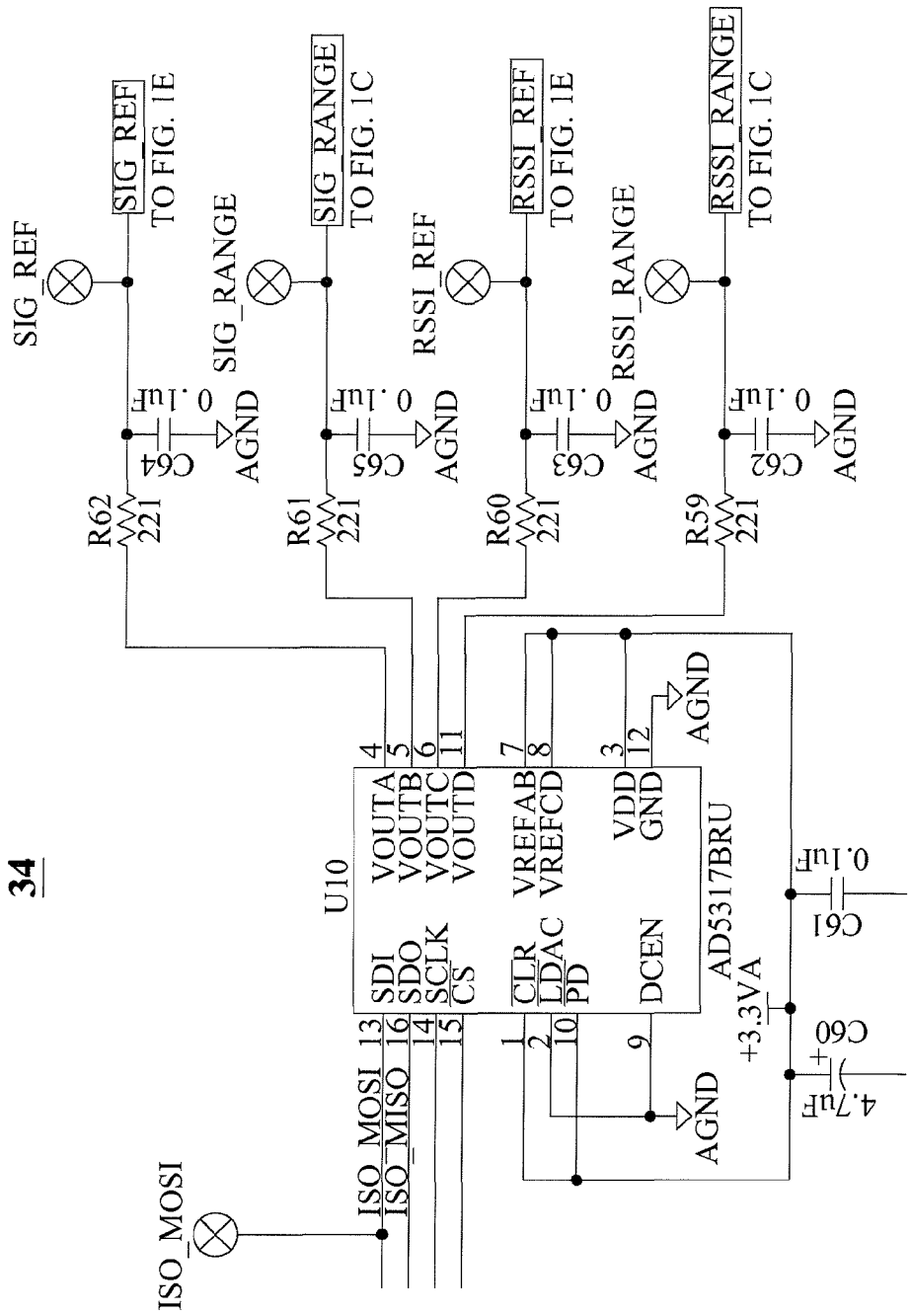

MULTI-FREQUENCY, MULTI-BEAM ACOUSTIC DOPPLER SYSTEM WITH CONCURRENT PROCESSING

CROSS-REFERENCES TO RELATED APPLICATIONS

This application is a continuation-in-part of U.S. application Ser. No. 12/639,989, filed Dec. 16, 2009, which is hereby incorporated by reference in it entirety, and claims the benefit of U.S. Provisional Application No. 61/162,651, filed Mar. 23, 2009, the entire contents of which are hereby incorporated by reference, and is a continuation-in-part application of U.S. application Ser. No. 12/340,315, filed Dec. 19, 2008 now U.S. Pat. No. 8,125,849, the entire contents of which are hereby incorporated by reference.

FIELD

Embodiments of the subject matter described herein relate generally to a system and method for operating multiple same-frequency and different-frequency acoustic sensor devices on various aquatic sensor platforms.

BACKGROUND

Acoustic Doppler Current Profilers ("ADCPs") are used by oceanographers and other scientists and technicians to measure the velocity water in lakes, rivers, bays and oceans. ADCPs use acoustic beams to measure current velocities and provide profiles of velocity measurements over a series of depth cells. ADCPs operate by transmitting sound signals through acoustic transducers and receiving echoes back from particles in the water. The change in frequency of the sound being sent compared to that being received, called the Doppler shift, is analyzed to determine the velocity of the water. Commonly used frequencies are in the range of under 100 kHz to about 5,000 kHz.

The acoustic frequency of an ADCP has a major impact on the performance of the system. More particularly, the ability to have an ADCP with multiple beam sets operating at different frequencies would provide better operational flexibility and achieve better results through a variety of measurement options and the ability to tune operation to different conditions. However, ADCPs typically are designed to operate at a single frequency. While some ADCPs have more recently been designed to operate at multiple frequencies, the frequency needs to be changed manually while the device is not in operation. Thus, there is a need for an ADCP that automatically adjusts operating frequencies of the sound signals being transmitted during operation and can operate at more than one frequency at the same time.

The processing method used by an ADCP to measure the Doppler shift is also important, and there are three common processing methods, each having different performance characteristics, advantages and disadvantages. Incoherent processing, or narrow band processing, can be used under a wide range of conditions to measure a wide range of velocity values. However, velocity data gathered by incoherent processing has a relatively high level of noise that requires the system to engage in a lot of averaging to remove. Pulse coherent processing has a much lower noise level than incoherent processing but has other limitations such as a lower measurable maximum velocity.

The third type of processing is called broadband processing, and is essentially a hybrid between incoherent and pulse coherent processing. Broadband processing provides a maximum velocity higher than pulse coherent but lower than incoherent with noise levels lower than incoherent but higher than coherent. These three processing methods, when used in combination, can achieve higher performance than is possible by using just one method. However, most existing ADCPs are capable of running only one of these processing methods at a time. Thus, there is a need for an ADCP that can run more than one processing method concurrently and automatically adjust the processing methods being used.

Another disadvantage of existing ADCP systems is that the subsystem for sending acoustic signals and receiving depth and velocity data (i.e., the collection loop) is typically separate from the subsystem that runs the processing method to analyze the received data. This type of arrangement can be inefficient and limit both the quantity and quality of data that can be collected. Thus, there is a need for an ADCP that runs the collection loop in parallel with the processing and analysis subsystem.

Therefore, there exists a need for an ADCP that can operate at different acoustic frequencies at the same time. There also is a need for an ADCP than can run more than one processing method concurrently. There exists a need for an ADCP that runs the collection loop and the processing in parallel. In particular, there is a need for an ADCP that can automatically change operating frequencies and processing methods such that it operates at different frequencies and employs different processing methods concurrently.

SUMMARY

The present disclosure, and its many embodiments, alleviates to a great extent the disadvantages of known ADCPs by providing an ADCP that can automatically adjust the acoustic frequencies sent out and can operate at more than one frequency at the same time. In addition, the present disclosure provides an ADCP that can automatically change the processing method being run and can run at least two processing methods concurrently. More particularly, the present disclosure provides these advantages by a system of parallel processing whereby one processor runs the transmission of acoustic frequencies and receipt of echoes and a second processor analyzes the received data and adjusts the acoustic frequencies and processing methods. Advantageously, disclosed embodiments continuously monitor the measurement conditions and use the information to select the best combination of frequencies and processing methods to optimize instrument performance.

In a general embodiment, the system and method uses an acoustic subsystem comprising an acoustic subsystem controller operatively connected to a plurality of acoustic transceivers, with a first of the plurality of acoustic transceivers, operating at a first acoustic frequency, operatively connected to a first group of at least one transducer, and a second of the plurality of acoustic transceivers, operating at a second acoustic frequency, operatively connected to a second group of at least one transducer. The acoustic subsystem controller is adapted to selectively operate each acoustic transceiver. The acoustic subsystem controller may comprise a digital circuit configured to sample analog signals received from groups of transducers operatively connected to the plurality of acoustic transceivers, the digital circuit sampling the analog signals in pairs having a pair-wise sampling frequency that is four times the operating frequency of the one of the plurality of acoustic transceivers operatively connected to a sampled transducer. The digital circuit may also sample the analog signals received from the sampled transducer with a periodic delay between sampling pairs, the delay being an integer number of periods of the operating frequency of the one of the plurality of the acoustic transceivers. The acoustic subsystem may further comprise a multiplexor adapted to switch a sampled analog channel between multiple individual transducers within the acoustic device.

In a first aspect, the acoustic subsystem is mounted on an aquatic sensor platform, with the first group including a first multi-element transducer array adapted to measure three dimensional motion within a first volume of aquatic environment, and the second group including a first transducer adapted to measure range to an object within a volume of aquatic environment angularly coincident with the first volume. The first transducer may be used to measure depth or altimetry within an aquatic environment.

In a second aspect related to the first, a third of the plurality of acoustic transceivers, operating at a third frequency, is operatively connected to a third group of transducers, with the third group including a multi-element transducer array adapted to measure three dimensional motion within a volume of aquatic environment angularly coincident with the first volume. The third operating frequency may be different than the first operating frequency in order to measure three dimensional motion in alternate environmental conditions.

In a third aspect related to the first, first group may include a second multi-element transducer array adapted to measure three dimensional motion within a second volume of aquatic environment, and the second group may include a second transducer adapted to measure range to an object within a volume of aquatic environment angularly coincident with the second volume, with the first and second volumes being generally oppositely directed from the aquatic sensor platform. The first and second volumes may be located above and below the sensor platform, which may be an autonomous or remotely operated vehicle.

In a fourth aspect related to the first, the second group may include a third transducer adapted to measure range to an object within a third volume of aquatic environment, with the third volume being angularly non-coincident with the first. The third transducer may be used to measure distance from an navigational obstacle or terrain, or in a mapping application.

In an exemplary embodiment, the system and method uses an integrated acoustic transducer system comprising a multi-element transducer array operating at a first frequency for measuring Doppler shifts caused by moving water within a body of water and an angularly coincident depth sensor transducer operating at a second frequency for measuring the depth of the body of water. In another exemplary embodiment, the system and method uses an integrated transducer system comprising a first multi-element transducer array operating at a first frequency for measuring Doppler shifts caused by moving water within a body of water, an angularly coincident depth sensor transducer operating at a second frequency for measuring the depth of the body of water, and a third multi-element transducer array operating at a third frequency for measuring Doppler shifts caused by moving water at greater depths than those measurable at the first frequency. The exemplary embodiments may be used to determine the flow of water through a cross-section of a body of water, such as the discharge of a river.

In an exemplary embodiment, an acoustic Doppler system comprises a plurality of acoustic transceivers, an acoustic subsystem controller and a main processing unit. A first of the plurality of acoustic transceivers operates at a first acoustic frequency and is operatively connected to a first group of transducers producing an acoustic signal. A second of the plurality of acoustic transceivers operates at a second acoustic frequency and is operatively connected to a second group of transducers producing an acoustic signal. The first and second acoustic transceivers are adapted to operate concurrently at the first and second acoustic frequencies. The acoustic subsystem controller is operatively connected to the first and second acoustic transceivers and controls the acoustic signals produced by the first and second group of transducers.

The main processing unit is operatively connected to the acoustic subsystem controller. The main processing unit is adapted to execute instructions to the first and second group of transducers to produce acoustic signals having at least two frequencies and is adapted to run at least two processing methods concurrently. The main processing unit analyzes data received by the first and second group of transducers, automatically adjusts the acoustic frequencies of the acoustic signals produced by the first and second group of transducers, and automatically selects a method of processing the data received by the first and second group of transducers. The method of processing is selected from the group consisting of: incoherent processing, pulse coherent processing and broadband processing. The main processing unit may resolve ambiguities in the received data to optimize acoustic frequencies of the acoustic signals produced by the first and second group of transducers. The main processing unit may be adapted to selectively operate each acoustic transceiver in the plurality of acoustic transceivers independently of the others of the plurality of acoustic transceivers. The main processing unit may also be adapted to selectively operate each acoustic transceiver in the plurality of acoustic transceivers one at a time, in groups and simultaneously.

The first group of transducers includes at least one profile transducer producing an acoustic signal. The acoustic signal produced by the at least one profile transducer has a frequency selected from the range of approximately 100 KHz to approximately 5 MHz. A Doppler frequency shift corresponding to the velocity of a volume of water relative to the profile transducer is derived from a returned profile echo from the volume of water. The data analyzed by the main processing unit relates to the returned profile echo and the derived Doppler frequency shift.

The second group of transducers includes at least one depth transducer producing an acoustic signal. The acoustic signal produced by the at least one depth transducer has a frequency selected from the range of approximately 100 KHz to approximately 5 MHz. A depth corresponding to the distance between the depth transducer and a bottom of a body of water is derived from a returned depth echo from the bottom of the body of water. The data analyzed by the main processing unit relates to the returned depth echo and the depth.

Embodiments of the disclosure further include methods of determining the flow of water. Exemplary methods comprise executing instructions to concurrently produce at least two acoustic signals having at least two frequencies. A first acoustic signal has a first frequency and a second acoustic signal has a second frequency. Methods include receiving data in response to one or both of the first and second acoustic signals and analyzing the received data. The frequencies of one or both of the first and second acoustic signals are automatically adjusted. One or more methods of processing the received data are automatically selected from the group consisting of: incoherent processing, pulse coherent processing and broadband processing, and at least two processing methods may be run concurrently.

The first acoustic signal may have a profile beam of a profile frequency and may have a profile frequency selected from the range of approximately 100 KHz to approximately 5 MHz. The data received in response to the first acoustic signal may be a Doppler frequency shift corresponding to the velocity of a volume of water derived from a returned profile echo from the volume of water. The data analyzed may relate to the returned profile echo and the derived Doppler frequency shift. The second acoustic signal may have a depth beam of a depth frequency and may have a depth frequency selected from the range of approximately 100 KHz to approximately 5 MHz. The depth corresponding to the distance between the depth transducer and a bottom of a body of water is derived from a returned depth echo from the bottom of the body of water, and the data analyzed may relate to the returned depth echo and the depth.

Exemplary embodiments include a control system for an acoustic Doppler system, comprising a processing unit that controls acoustic signals produced by the acoustic Doppler system. The processing unit is adapted to execute instructions to produce acoustic signals having at least two frequencies and is adapted to run at least two processing methods concurrently. The processing unit analyzes data received by the acoustic Doppler system, automatically adjusts the acoustic frequencies of the acoustic signals produced by the acoustic Doppler system, and automatically selects a method of processing the data received by the acoustic Doppler system. The method of processing may be selected from the group consists of: incoherent processing, pulse coherent processing and broadband processing.

Embodiments of a control system may further comprise a plurality of acoustic transceivers. A first of the plurality of acoustic transceivers is operatively connected to a first group of transducers, and a second of the plurality of acoustic transceivers is operatively connected to a second group of transducers. The first of the plurality of acoustic transceivers operates at a first acoustic frequency, and the first group of transducers produces an acoustic signal. The second of the plurality of acoustic transceivers operates at a second acoustic frequency, and the second group of transducers produces an acoustic signal. The first and second acoustic transceivers are adapted to operate concurrently at the first and second acoustic frequencies and are operatively connected to the processing unit.

The features and functions discussed herein can be achieved independently or in combination in various embodiments and aspects, as will be seen with reference to the following description and drawings. Ordinal adjectives such as "first," "second," and "third" are used to distinguish between similar instances of a named element rather than to describe the required number or order of such elements, i.e., "first" and "third" groups of transducers may be present even in the absence of a "second," unless an express statement is made to the contrary.

BRIEF DESCRIPTION OF THE DRAWINGS

The accompanying figures depict various aspects of the system and method. A brief description of each figure is provided below. Elements with the same reference number in each figure indicate identical or functionally similar elements.

FIGS. 1B-1F are schematic diagrams of components of the acoustic subsystem controller 30 element shown in FIG. 1A. FIGS. 1B-A through 1B-E are partial views of FIG. 1B as indicated therein. FIGS. 1C-A and 1C-B are partial views of FIG. 1C as indicated therein. FIGS. 1D-A and 1D-B are partial views of FIG. 1D as indicated therein. FIGS. 1E-A and 1E-B are partial views of FIG. 1E as indicated therein. FIGS. 1F-A and 1F-B are partial view of FIG. 1F as indicated therein.

DETAILED DESCRIPTION

A multi-frequency, multi-beam acoustic Doppler system may be employed to obtain velocity profiles within a body of water such as a canal, river, narrows, bay, or even open water in order to obtain information such as a discharge profile, current profile, or the like for use in water resources management, riverine and estuarine modeling, navigational mapping, and other applications. In such systems, the ability to employ multiple frequencies of acoustic energy provides a useful means for adapting the data collection process depending upon the type of data to be obtained and the conditions of the acoustic environment. For example, low frequency acoustic energy, such as a 0.5 MHz pulse, may be well suited for use in range finding, and high-frequency acoustic energy, such as a 3.0 MHz pulse, may be well suited for use in Doppler measurement and velocity estimation over range of up to 5 meters, while mid frequency acoustic energy, such as a 1 MHz pulse, may be better suited for Doppler measurement and velocity estimation over an extended range of up to 30 meters, but at the cost of lower sampling frequencies and lower measurement detail.

Acoustic Doppler systems incorporating multi-frequency sensors have heretofore been assembled from multiple independent acoustic systems, in which each acoustic system includes a transducer, a transceiver, and a controller/signal processor which is designed to control a particular transducer or multi-element transducer array for operation at a single acoustic frequency. Such independent systems can be 'combined' by forwarding the data gathered by the systems, such as a velocity profile, altitude-above-bottom, velocity-of-thebottom or depth-from-surface, to a general purpose computer for analysis and further processing. However, such a conglomerate of systems cannot readily accommodate multiple systems operating at the same acoustic frequency, where cross-talk between systems caused by side-lobe interference, double and multi-path reflections, and other phenomena may interfere with the measurements made by each system and subsequent data analysis. Such a conglomerate of systems is also prohibitively expensive and bulky, since each acoustic system is, by its nature, designed for independent operation, and must be networked back to yet another independent system, such as a laptop computer, if real-time or semi-real-time information is to be presented to a field operator responsible for directing the aquatic sensor platform or adjusting operations in response to conditions in the aquatic environment.

Figure 1A:
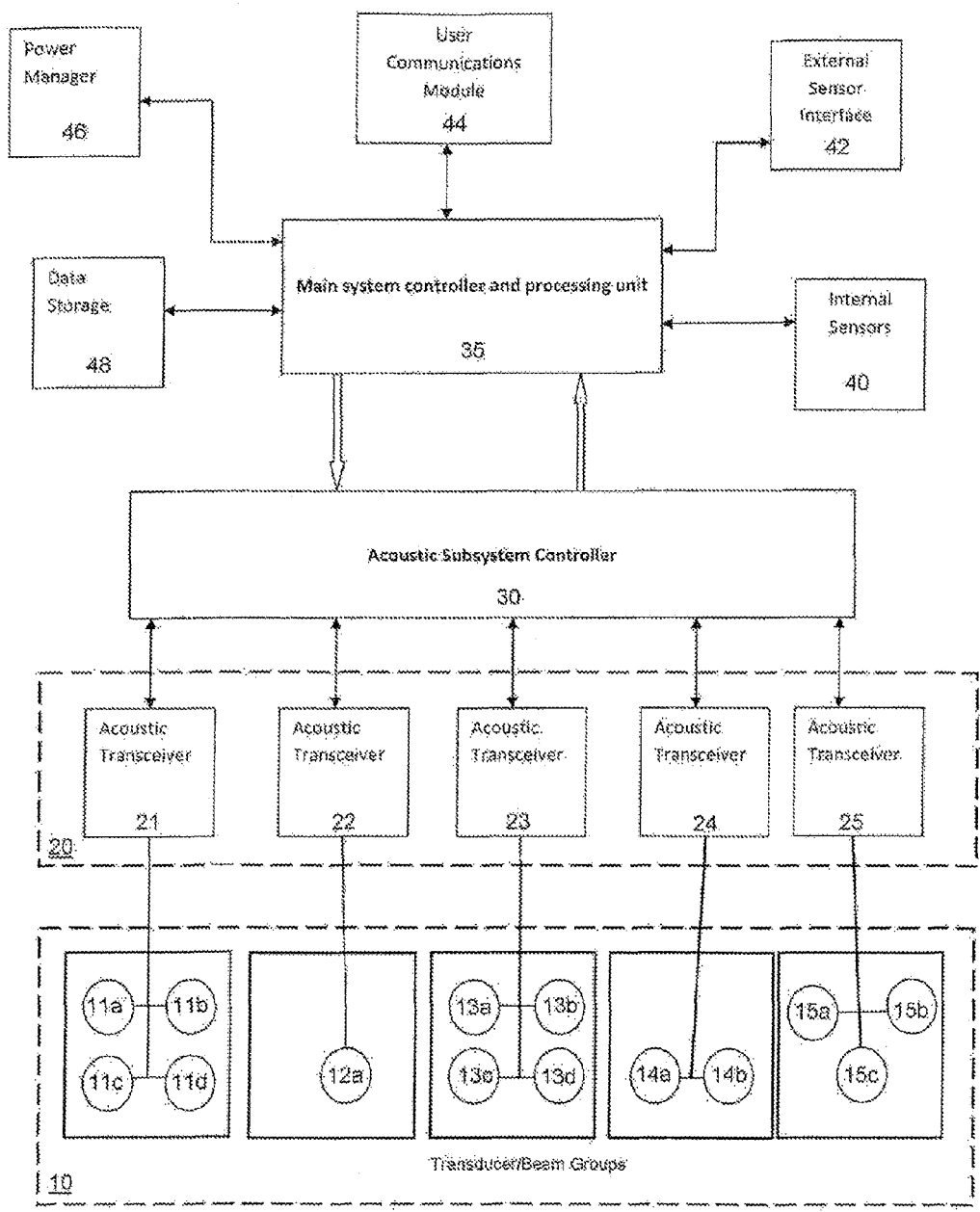
FIG. 1A is a block diagram of an electronics package in one embodiment of the system and method.
Figure 1B:
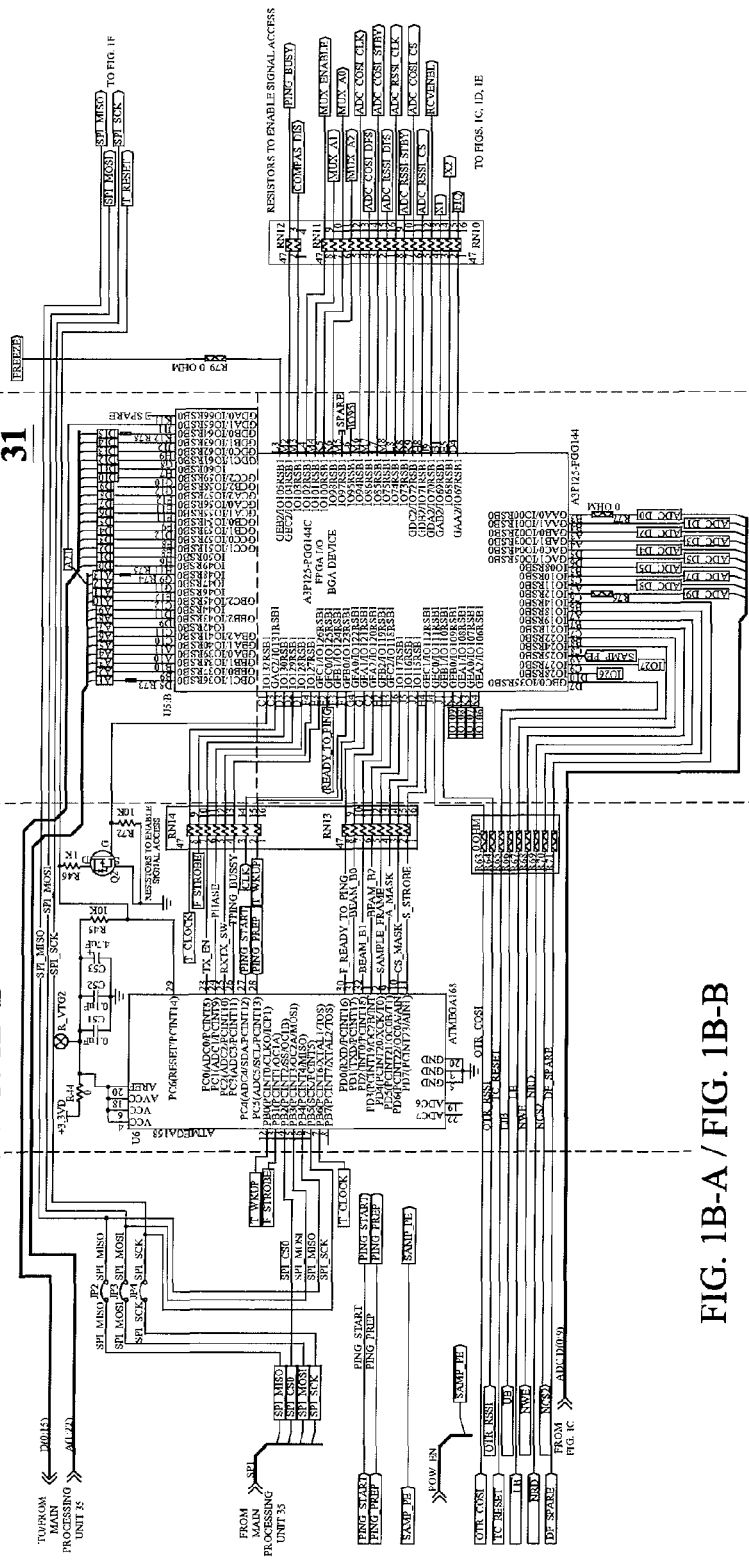
Figure 1C:
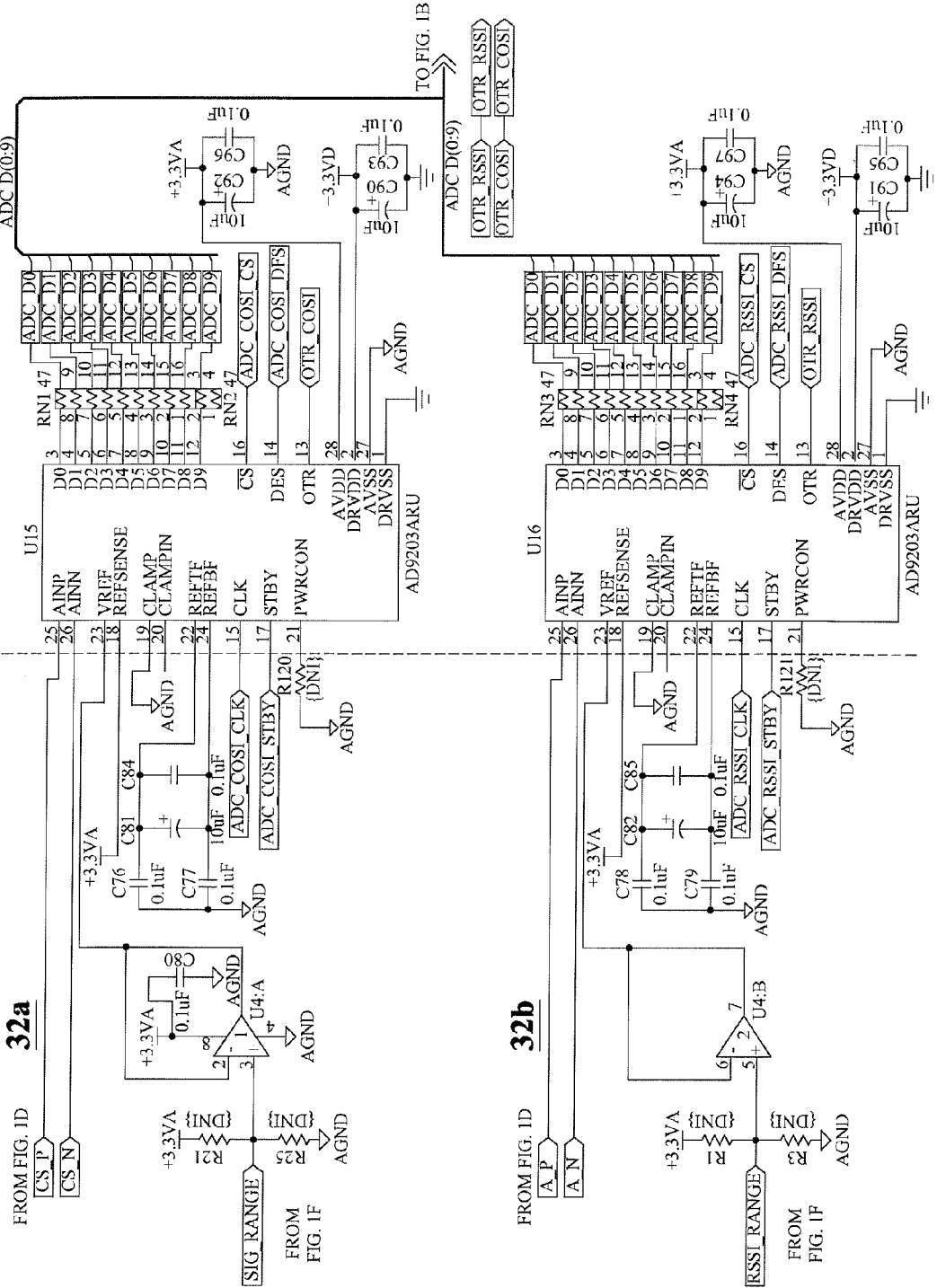
Figure 1E:
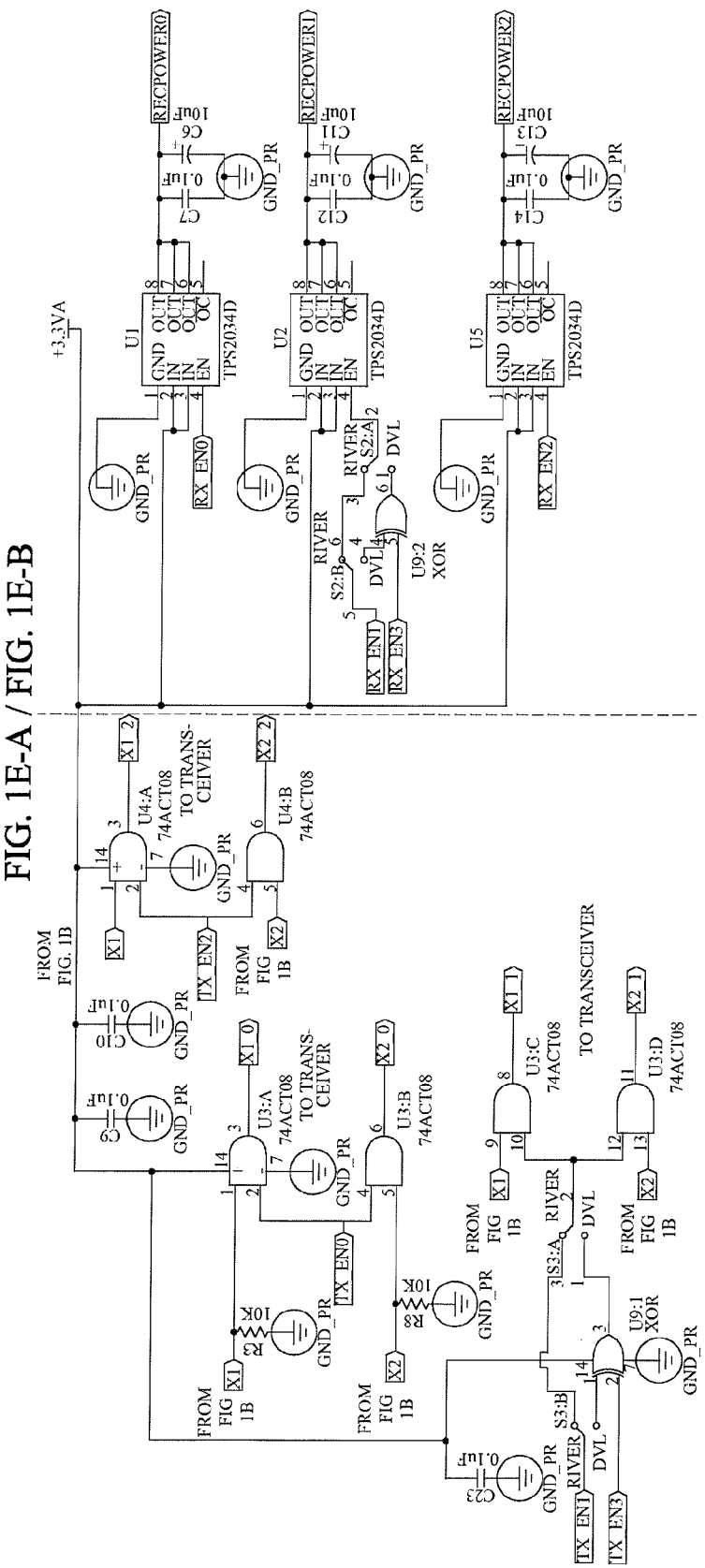

With initial reference to FIG. 1A, the present system and method permits multiple acoustic systems to be more effectively controlled and operated by interconnecting a plurality of acoustic transceivers 20 and groups of transducers 10 through a common acoustic subsystem controller 30. The acoustic subsystem controller 30 is adapted to selectively operate each individual acoustic transceiver. The acoustic subsystem controller 30 is also adapted to pass transceiver signals to a main processing unit 35 including signal processing hardware such as a general purpose processing unit, a digital signal processing unit, and the like, the hardware of the main processing unit being generally known within the art. Notably, a first of the acoustic transceivers 21 may operate at a first acoustic frequency, such as 3 MHz, and be connected to a group of transducers 11a, 11b, 11c, and 11d in a multi-element transducer array for purposes such as Doppler measurement and velocity estimation within a volume generally bounded by the beams of the array, as further described in the exemplary embodiments discussed below. A second of the acoustic transceivers 22, may operate at a second acoustic frequency, such as 0.5 MHz, and be connected to a transducer 12a for purposes such as measuring range to an object within a volume, defined by the acoustic beam, which is angularly coincident with the volume defined by the transducers 11a, 11b, 11c, and 11d, as further described in the exemplary embodiments discussed below. Those of skill will appreciate that references to beams or volumes being "angularly coincident with" other beams or volumes make use of the aquatic sensor platform as a common origin/reference point for the comparison, and that an "object" in this context is any transition between the aquatic medium and a macroscopic medium such as air, earth, metal, or the like including, e.g., the surface of a body of water, the bed of a body of water, the walls of channels or pipes, and marine structures such as buoys, anchoring devices, etc.

The acoustic subsystem controller 30 is preferably modular so that additional acoustic transceivers 20 can be connected through essentially identical hardware in order to add additional frequency capabilities. For example, a third of the acoustic transceivers 23 may operate at a third acoustic frequency, such as 1 MHz, and be connected to a group of transducers 13a, 13b, 13c, and 13d in a multi-element transducer array for purposes such as Doppler measurement and velocity estimation within a volume generally bounded by the beams of the array and angularly coincident with the volume defined by the transducers 11a, 11b, 11c, and 11d. The third transceiver 23 and third group of transducers may be used for purposes such as Doppler measurement and velocity estimation in alternate environmental conditions, such as deeper bodies of water, different types of beds (e.g., rocky or muddy), different types of surfaces (e.g., calm, roiled, or iced over), and different types of acoustic properties (e.g., clear water versus water carrying high loads of suspended solids). Those of skill will also appreciate that the systems described can be used to obtain velocity profiles in essentially any sufficiently large aquatic environment, and may be operated in varying orientations including those described below.

The acoustic subsystem controller 30 is also preferably modular in the sense that the transceivers in the plurality of acoustic transceivers 20 can be independently operated through the acoustic subsystem controller 30 such that groups of transducers 10, e.g., the group 11a, 11b, 11c, and 11d, can be turned off in order to avoid interference or cross-talk both between groups of transducers operating at the same acoustic frequency, e.g., transducers in differently directed transducer sensor groups. Such interference or cross talk may arise when the aquatic sensor platform becomes positioned too close to the boundary of a body of water, e.g., the wall of a canal, or encounters an object which is an efficient reflector of acoustic energy, such as a submerged pipeline.

While additional acoustic transceivers 20 will typically be provided and/or added in order to add additional frequency capabilities, transceivers need not necessarily provide an additional frequency capability. For example, a fourth of the acoustic transceivers 24 may operate at the second acoustic frequency and be connected to a group of transducers 14a and 14b for purposes such as measuring range to objects within volumes, defined by the respective acoustic beams, which are angularly non-coincident with each other. A fifth of the acoustic transceivers 25 may operate either at one of the aforementioned acoustic frequencies or at yet another acoustic frequency with a group of transducers, 15a, 15b, 15c, etc., configured for essentially any known application calling for acoustic sensing and analysis by transducers driven at a common acoustic frequency. Thus, the acoustic subsystem controller 30 and main processing unit 35 permit a number of multi-frequency and/or multi-beam acoustic systems to be controlled, sampled, and summarized to an operator through a single hardware interface. That hardware interface may also include: internal sensors 40 such as pitch and roll sensors, a digital compass, etc.; an external sensor interface 42 for sensors such as a GPS interface, temperature sensors, salinity sensors, pressure, etc.; a user communications module 44 for transmission of control signals and/or results over electrically wired, optically wired, radio wireless, and/or acoustic wireless telecommunications connections; a power manager 46 for supplying power to the system, and a data store 48 for recording analysis results, measured data, selected signals from the acoustic transceivers, control signals, hardware states, etc. as desired by the manufacturer and/or field operator.

With reference to FIGS. 1B-1F, the acoustic subsystem controller 30 may comprise a digital circuit configured to sample analog signals received from groups of transducers 10 operatively connected to the plurality of acoustic transceivers 20, the digital circuit sampling the analog signals in pairs having a pair-wise sampling frequency that is four times the operating frequency of the one of the plurality of acoustic transceivers operatively connected to a sampled transducer, i.e., pairs separated by one quarter of the period of the emitted wave (or one quarter of a cycle of the emitted waveform) generated by the associated transceiver. The digital circuit generally includes a logic processor 31 operatively connected to an analog-to-digital converter (A/D converter) 32a, and may include a multiplexor 33a adapted to switch the analog channel sampled by the A/D converter between lines carrying analog signals from individual transducers. In the illustrated aspect shown in FIG. 1B, the logic processor 31 is a Field Programmable Gate Array (FPGA) paired with a microcontroller which controls a reference signal generator 34 (shown in FIG. 1F), but in other aspects the logic processor may itself control the reference signal generator 34, and in still other aspects the logic processor 31 may be an Application Specific Integrated Circuit (ASIC), a high speed general purpose processor, or other equivalent processing means. In the illustrated aspect shown in FIGS. 1C and 1D, the logic processor 31 is operatively connected to a first A/D converter 32a and first multiplexor 33a to sample received signal frequency and phase (i.e., the acoustic frequency, likely Doppler-shifted, of reflected acoustic energy received by a transducer), and to a second A/D converter 32b and second multiplexor 33b to sample received signal strength (i.e., the intensity of reflected acoustic energy received by a transducer). The combination of an FPGA logic processor 31, dual A/D converters 32a and 32b, and dual multiplexors 33a and 33b, permits the circuit to be manufactured from lower speed and more power efficient parts while avoiding the expense of a custom ASIC design.

The acoustic subsystem controller 30 may also be adapted to operatively control the plurality of acoustic transceivers 20 to sound a specified group of transducers 10 for a specified number of pulses having a specified duration and interval, according to instructions in a sampling scheme 54, described in further detail below, otherwise executed by main processing unit 35. In such aspects, the acoustic subsystem controller 30 may include circuitry adapted to direct transceiver control signals generated by the logic processor 31 to a selected one of the plurality of acoustic transceivers 20, with an example of such circuity being shown in FIG. 1E. In the illustrated aspect, the circuity is adapted to direct transceiver control signals generated by the logic processor 31 to the plurality of acoustic transceivers one at a time, in groups, and simultaneously depending upon the operation of transmission-enabling signaling lines "TX_EN[#]" controlled by the logic processor 31 or main processing unit 35. Transmitting lines from the logic processor 31, "X1" and "X2", are connected to transmitting lines to the individual acoustic transceivers, "X1_[#]" and "X2_[#]", in order to allow the logic processor to selectively operate each acoustic transceiver in the plurality of acoustic transceivers 20 independently of the others. A simultaneous operation of transmission-enabling signaling lines also permits the transmitting lines from the logic processor 31 to operate groups of acoustic transceivers or all of the plurality of acoustic transceivers simultaneously.

Figure 1G:
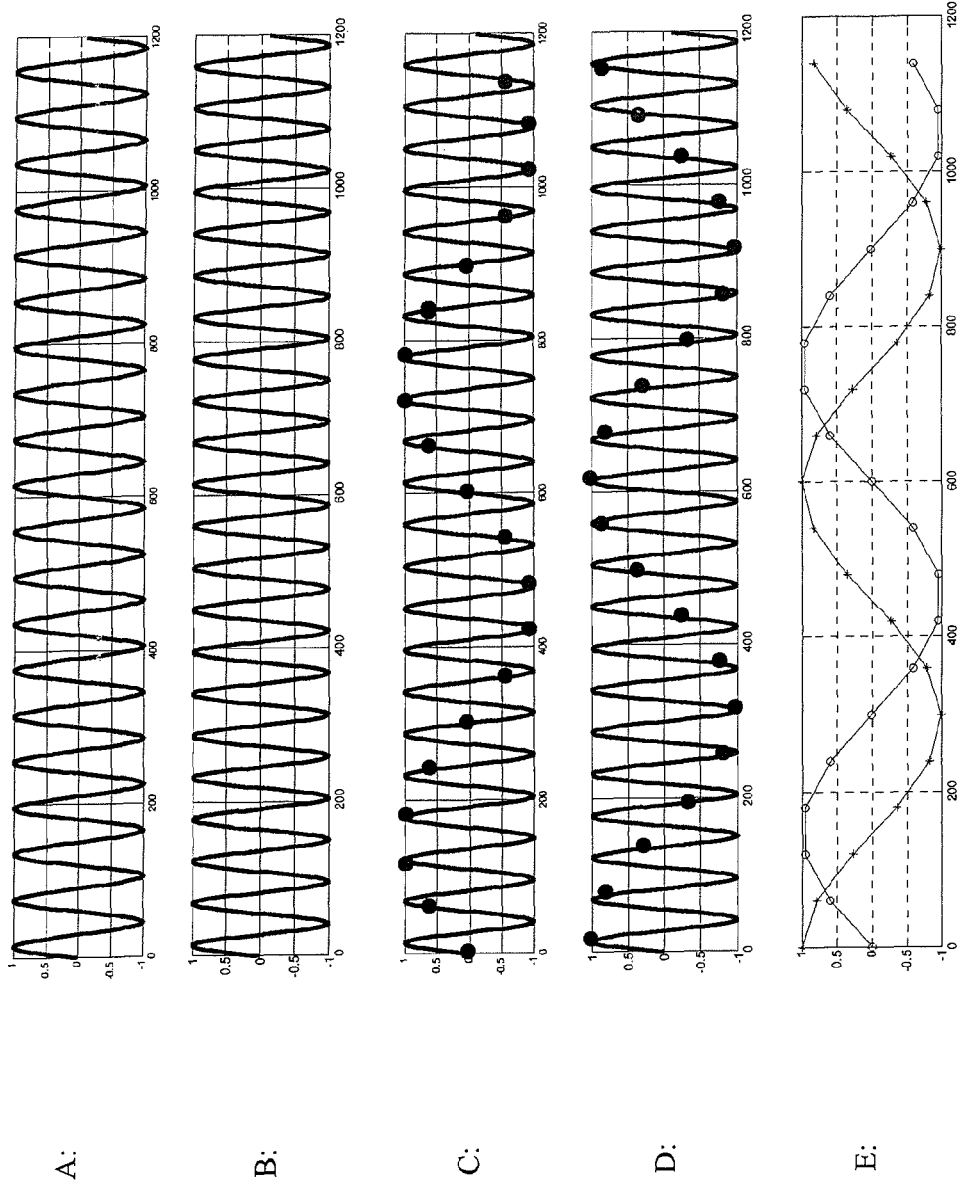
FIG. 1G is a signal diagram depicting the sampling of analog signals received from transducers operatively connected to an acoustic transceiver operating at a first acoustic frequency, e.g., 0.5 MHz.

As shown in FIG. 1G, the digital circuit samples the analog signals received from a sampled transducer, such as transducer 11a, to obtain a pair of digital samples separated by one quarter of the period of the wave emitted during the sounding of that transducer. An exemplary emitted waveform is shown on row A, and an exemplary Doppler-shifted received waveform is shown on row B. The logic processor 31 samples the A/D converter 32a at an integer number of periods of the operating frequency, as determined by the main processing unit 35 and information (supplied by the individual transceiver or entered by a user) concerning the operating frequency of the transceiver and sampled transducer, e.g., transceiver 22 and transducer 12a. Each sample constitutes a pair of values, separated by one quarter of the period of the operating frequency, containing information concerning the received signal frequency and phase. For clarity of illustration, the timing of the sampling of the first member of the pair is shown on row C, and the timing of the sampling of the second member of the pair is shown on row D. By sampling the analog signals received from a sampled transducer at the same frequency as the operating frequency of the transceiver and sampled transducer, the frequency of the emitted waveform is effectively removed, with only the Doppler-shift frequency component being reflected in the resultant digital values. By sampling the analog signals received from a sampled transducer in pairs separated by one quarter of the period of the emitted waveform, the members of the pair may be treated as the cosine (in-phase) and sine (quadrature) components of a Doppler-shift signal. This digital sampling system and method advantageously eliminates the frequency-specific analog quadrature demodulation circuity which is found in prior single frequency acoustic Doppler controller/signal processors. An example of such circuitry is shown and discussed in U.S. Reissue Pat. No. 35,535, the entire contents of which are hereby incorporated by reference. A series of digital values obtained from the A/D converter 33a may be stored within the logic processor 31 and further processed to determine the Doppler frequency of the received acoustic energy, and ultimately the relative velocity of portions of an aquatic medium, according to methods such as those discussed in the referenced patent or otherwise available within the art. In the aspect shown in FIGS. 1C and 1D, where the logic processor 31 samples a second A/D converter 32b and second multiplexor 33b to sample received signal strength, the second A/D converter 32b may be sampled only once per sampling event, for example during the sampling of the first member of the pair, in order to obtain received signal strength information for storage and further processing according to known methods.

The exemplary signals illustrated in FIG. 1G include an exaggerated Doppler shift for ease and clarity of illustration. In practice, the acoustic subsystem controller 30 need not sample the analog signals received from at the sampled transducer once per period of the emitted wave. Instead, the digital circuit may sample the analog signals with a periodic delay between sampling, the delay being a number of periods of the operating frequency of the one of the plurality of the acoustic transceivers. In one aspect, the logic processor 31 samples the A/D converter 32a for an analog signal received from particular transducer to obtain a pair during every eighth period of the emitted wave, i.e., the at a rate that is one eighth of the operating frequency of the one of the plurality of acoustic transceivers operatively connected to a sampled transducer. The number of periods (or time separation between pairs) may be varied in other aspects depending upon the bandwidth of the received analog signal that the manufacturer or a user-operator wishes to resolve during the Doppler velocity measurement process.

Figure 2A:
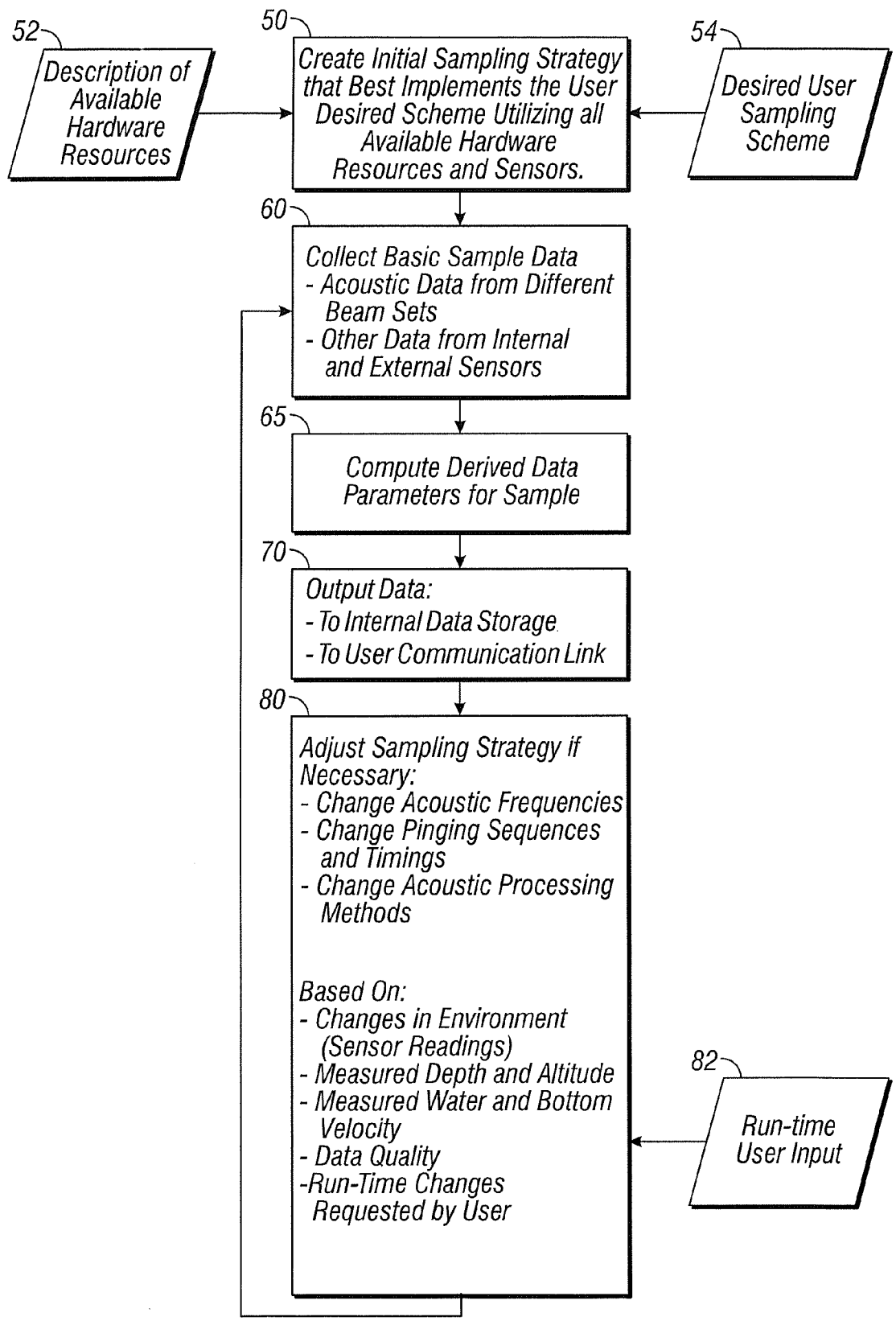
FIG. 2A is a flow chart of an operating procedure in one embodiment of the system and method.

With reference to FIG. 2A, the acoustic subsystem controller 30 and main processing unit 35, by virtue of being operatively connected to a plurality of acoustic transceivers 20 and groups of transducers 10 rather than any single group, may be adapted to reorder and optimize the collection of sample data based on conditions within the aquatic environment, even without run-time intervention from the field operator of the system. The system may instead assess the available transceiver/transducer hardware 52 via a user input description and/or, preferably, hardware self-identification using a so-called "plug-and-play" technique, and obtain a user specified sampling scheme 54. The system may then self-create an initial sampling strategy at step 50, implementing the user specified scheme while automatically resolving conflicts among the available transceiver/transducer hardware 52. For instance, it may be desirable to require that transducers 14a and 14b, generating acoustic beams which have the same acoustic frequency but are angularly non-coincident with each other, be operated with delay of a few milliseconds between the pinging of transducer 14a and transducer 14b in order to avoid double reflections, multi-path reflections, and other phenomena which may interfere with measurements and data analysis. Further, it may be desirable to require that transceivers 22 and 24, and the transducers associated therewith, be operated with delay of a few milliseconds between the pinging of transducers 12a, 14a, and 14b in order to avoid side-lobe interference, double and multi-path reflections, and other phenomena that may interfere with the measurements and data analysis across otherwise separate subsystems operating at the same acoustic frequency.

Figure 2B:
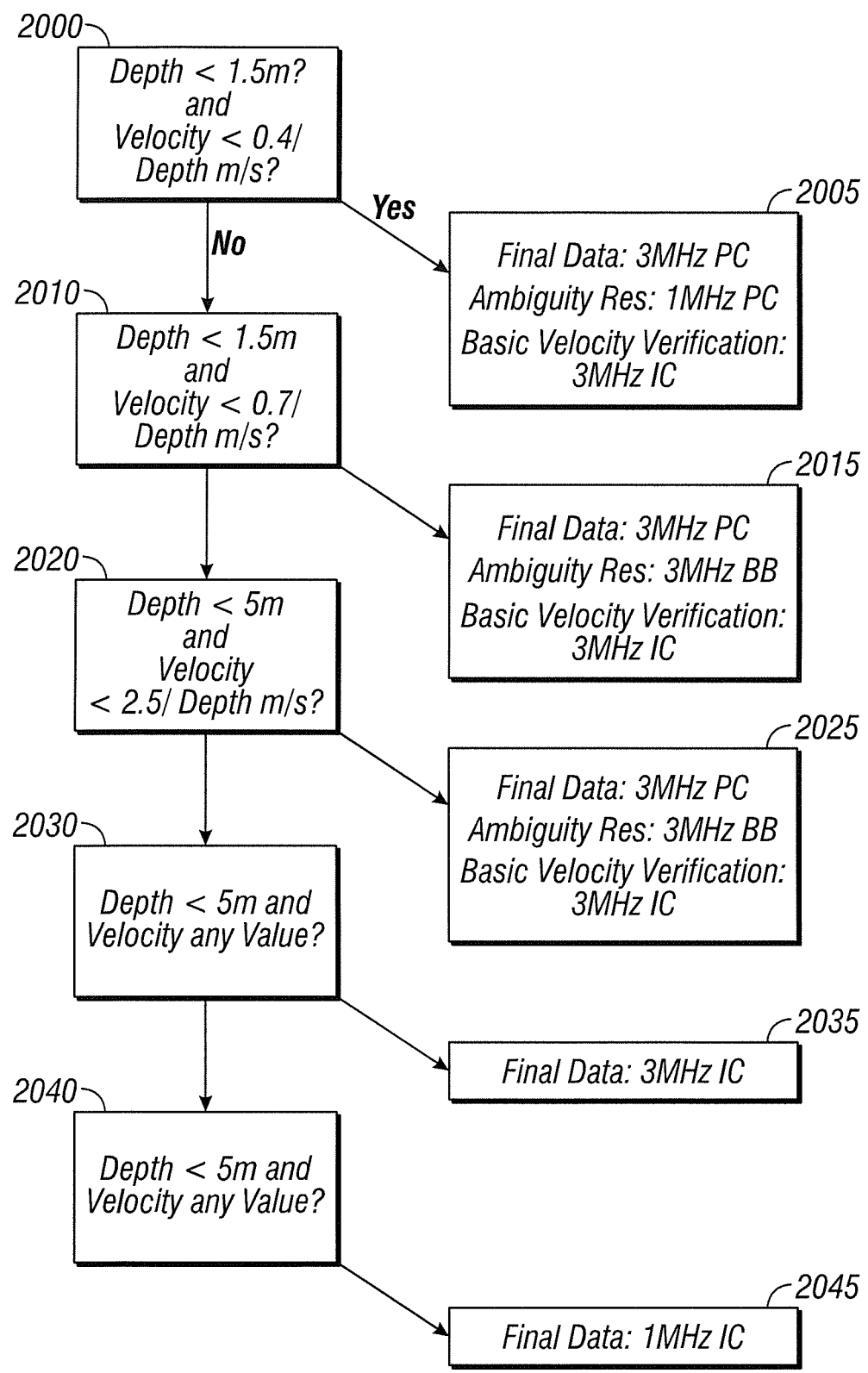
FIG. 2B is a flow chart of an operating procedure in one embodiment of the system and method.

The system may then begin to collect sample data at step 60, based on the user specified sampling scheme 54 and the initial sampling strategy determined at step 50. Signals received from the transceivers 20 and associated transducers 10 are digitized by the acoustic subsystem controller 30, passed to the main processing unit 35, and, in combination with data obtained from the internal sensors 40 and external sensor interface 42, used to compute derived data parameters and analysis results such as a depth or altitude, a velocity estimate, a discharge or current estimate, etc. at step 65. The system may then output at least the derived data and analysis results, collectively the data, at step 70 to the user communications module 44 and/or the data store 48. Notably, by centralizing control and signal processing within the acoustic subsystem controller 30 and main processing unit 35, the system and method may adjust the sampling strategy at step 80. For example, the system may, after sampling transducer 12a, determine that Doppler measurement using only the acoustic transceiver 21 or 23 and associated transducers is unsatisfactory, and adjust the sampling strategy to include Doppler measurement using acoustic transceivers 21 and 23, or vice versa, depending upon factors such as signal quality due to the character of the aquatic medium and/or surface and/or bed, a measured depth or altitude, a measured water or bottom velocity (particularly a bottom velocity indicating rapid movement of the aquatic sensor platform), etc. For further example, the system may, after sampling available transducers, optimize sampling between the transducers by changing pinging sequences and timings in order to avoid side-lobe interference, double and multi-path reflections, and other phenomena while maintaining, where possible, the user specified sampling scheme and desired data resolution. Additionally, the system may change acoustic processing methods such as filtering and correlation schemes. Finally, the system may change any aspect of the sampling strategy and/or computations/processing methods in response to run-time user input 82, such as a change in preferences or a manual override of the system's self-created sampling strategy, but no run-time user input is required for the automatic embodiments described with reference to FIG. 2B. Turning to FIG. 2B, an exemplary embodiment of an ADCP that permits automatic control and adjustment of acoustic frequencies and processing methods will be described. The system architecture is substantially the same as that described above with reference to FIG. 2A, but many of the data processing steps are different. In general, based upon continually collected water depth and velocity data, the system automatically selects the best acoustic frequencies and processing methods to measure velocity. Advantageously, the system can run at least two separate frequencies and processing methods concurrently. The system also incorporates parallel processing such that the acoustic subsystem controller 30 controls the production of acoustic signals and receipt of data while the main processing unit 35 analyzes the data and adjusts the frequencies and processing methods. It should be noted that this automatic control of signal production, data analysis and adjustment of frequencies and processing methods could be performed by a single processing unit. The frequency and processing method pairings include, but are not limited to, 1 MHz Incoherent (IC) and 1 MHz Pulse Coherent (PC); 1 MHz Broad Band (BB) and 3 MHz Incoherent; and 3 MHz Pulse Coherent and 3 MHz Broad Band. More than one frequency and processing method pairing may be used, and with any combination some incoherent velocity signals are preferably always transmitted due to their high maximum velocity.

As discussed above with reference to FIG. 1A, the acoustic subsystem controller 30 and main processing unit 35 are operatively connected to a plurality of acoustic transceivers 20 and groups of transducers 10. In operation, as shown in FIG. 2A, the ADCP accesses the available transceiver/transducer hardware 52 and then self-creates an initial sampling strategy at step 50. The system begins to collect sample data at step 60 based on the user specified sampling scheme 54 and the initial sampling strategy determined at step 50. Signals are received from transceivers 20 and associated transducers 10 and are digitized by acoustic subsystem controller 30, which passes the signals to main processing unit 35.

In exemplary embodiments the system collects three types of signals, or "pings," concurrently, including incoherent processing, pulse coherent processing and a third signal for ambiguity resolution. The incoherent data is used to track velocity. More particularly, the system averages all the valid cells of incoherent velocity for each transducer beam and then filters the average beam velocity value. It should be noted that the minimum operating depth of the ADCP is dictated by the minimum depth necessary to get one valid incoherent velocity cell. This depth for a 3 MHZ incoherent configuration is about 28 cm of water below the transducer (i.e., about 5 cm blank, about 10 cm pulse, about 10 cm cell, and a 10% allowance for sidelobes). These values vary based on the frequency and incoherent configuration, and in some cases the sidelobe allowance is not necessary.

The averaging and filtering steps advantageously reduce the noise in the velocity data to acceptable levels. The maximum averaged and filtered incoherent velocity of all transducer beams is the maximum beam velocity used to determine the appropriate velocity method. The system applies a safety margin of at least about 80% to the velocity criteria to account for noise and the effects of averaging and filtering. Moreover, in some instances one set of transducer beams tracks incoherent velocity while another set of beams rotated 45 degrees from the first set tracks pulse coherent or broadband velocity. In these instances, the maximum beam velocity that can be observed changes, making application of the safety margin necessary. Additional refinements may include combining the tracked incoherent beam velocities to determine the maximum beam velocity that any beam set, at any orientation, would see. This advantageously helps to maintain the approximately 80% safety margin, which is needed for rapid changes in conditions, such as quickly moving the ADCP into a new region with different depth and velocity.

An exemplary embodiment of a method of selecting the best acoustic frequency signals will now be described with reference to FIG. 2C. The main processing unit 35 selects the best velocity measuring method based on continually tracked and updated depth and velocity values. The table below summarizes an exemplary embodiment of the selection process used for water depths of about 5 meters.

| Depth (m) | Velocity (m/s) | Operating Method |
|---|---|---|
| <1.5 | <(0.4/Depth) | Final data: 3 MHz Pulse Coherent, Ambiguity resolution: 1 MHz Pulse Coherent Basic velocity verification: 3 MHz Incoherent |

-continued

| Depth (m) | Velocity (m/s) | Operating Method |
|---|---|---|
| <1.5 | <(0.7/Depth) | Final data: 3 MHz Pulse Coherent, Ambiguity resolution: 3 MHz Broadband Basic velocity verification: 3 MHz Incoherent |
| <5 | <(2.5/Depth) | Final data: 1 MHz Pulse Coherent, Ambiguity resolution: 3 MHz Broadband Basic velocity verification: 3 MHz Incoherent |
| <5 | Any value | Final data: 3 MHz Incoherent |
| >5 | Any value | Final data: 1 MHz Incoherent |

At step 2000 the main processing unit 35 queries whether the depth is less than about 1.5 meters and the velocity is less than about 0.4 meters per second divided by depth. If so, at step 2005 the acoustic frequency for the final data is 3 MHz pulse coherent, the ambiguity resolution frequency is 1 MHz pulse coherent and the basic velocity verification is 3 MHz incoherent. If not, at step 2010 the main processing unit 35 queries whether the depth is less than about 1.5 meters and the velocity is less than about 0.7 meters per second divided by depth. If so, at step 2015 the acoustic frequency for the final data is 3 MHz pulse coherent, the ambiguity resolution frequency is 3 MHz broadband and the basic velocity verification is 3 MHz incoherent. If not, at step 2020 the main processing unit 35 queries whether the depth is less than about 5 meters, the velocity is less than about 2.5 meters per second divided by depth. If so, at step 2025 the acoustic frequency for the final data is 1 MHz pulse coherent, the ambiguity resolution frequency is 3 MHz broadband and the basic velocity verification is 3 MHz incoherent. If not, at step 2030 the main processing unit 35 queries whether the depth is less than about 5 meters and the velocity is any value. If so, at step 2035 the acoustic frequency for the final data is 3 MHz incoherent. If not, at step 2040 the main processing unit 35 queries whether the depth is greater than about 5 meters and the velocity is any value. If so, at step 2045 the acoustic frequency for the final data is 1 MHz incoherent.

The system applies a hysteresis to the criteria for depth and velocity to avoid switching too rapidly during transitions between different velocity methods. More particularly, there is typically a 1-2 second delay between when the main processing unit 35 selects the velocity method and when the velocity method is updated. The hysteresis is a result of the parallel processing loop whereby the production of acoustic signals and receipt of data are conducted by the acoustic subsystem controller 30 and the data analysis and adjustment of frequencies and processing methods are performed by the main processing unit 35. Another quality control mechanism that can be advantageously employed is to compare the incoherent velocity for any point in time to the limitations of the other pinging methods, broadband or pulse coherent velocities used at the same time. If the velocity value for a particular point in time exceeds those limitations, the system does not report that data and instead reverts to the incoherent velocity data. Furthermore, if there is not one good incoherent velocity cell to verify that the data is within operating limits, the other pinging methods data is not reported.

In pulse coherent operation different approaches to ambiguity resolution may be employed, depending on the frequency of pulse coherent data being used. Ambiguity resolution for 3 MHz pulse coherent operation will now be described in more detail. A relatively high frequency of 3 MHz has a relatively narrow operating range (i.e., max velocity of about 0.45 m/s at a depth of 1 m) but provides very good resolution within this range (i.e., for cells of about 2 cm). A 1 MHz pulse coherent signal can be used to resolve the ambiguities for 3 MHz pulse coherent operation. Although this increases the maximum velocity by a factor of 3, it advantageously can be conducted over the whole operating range of the 3 MHz pulse coherent operation. In conducting ambiguity resolution, the data is aligned cell by cell so that the closest ambiguity resolution cell is used to resolve a particular 3 MHz pulse coherent cell to arrive at the final velocity value.

Alternatively, a 3 MHz broadband signal can be used for ambiguity resolution. This is a viable approach when out of range of the ambiguity resolution provided by 1 MHz pulse coherent operation and works well for water depths of greater than 0.4 meters. However, in depths of less than 0.4 meters one cannot obtain valid 3 MHz broadband cells so filtered 3 MHz incoherent data is used for ambiguity resolution, which is effective for the limited area of less than 0.4 meters.

The maximum depth for using the 3 MHz pulse coherent signals is about 1.5 m, and in water having greater depths the ambiguity velocity drops to as little as 0.1 m/s because of the increased lag time. This creates the possibility that small spikes in the ambiguity resolution data will cause errors when resolving ambiguities for some cells. Application of a filter to the ambiguity resolution data prior to resolving ambiguities reduces these errors. In exemplary embodiments, a Gaussian filter with a standard deviation of 1 is used. Filtering of the ambiguity resolution data advantageously expands the range over which pulse coherent data can be used.

Ambiguity resolution for 1 MHz pulse coherent operation will now be described. Typically, a 3 MHz broadband signal is used for ambiguity resolution with the 1 MHz pulse coherent operation. The data is aligned cell by cell such that the closest 3 MHz broadband cell is used to resolve a particular 1 MHz pulse coherent cell for the final velocity value. The maximum velocity that can be obtained is limited to 5 times the maximum velocity for the same pulse coherent signal without ambiguity resolution. In water having a depth of less than about 0.4 meters, 3 MHz broadband data cannot be collected, and 3 MHz pulse coherent data may be used instead if the velocity is slow enough. Alternatively, if the velocity is not slow enough for 3 MHz pulse coherent, then 3 MHz incoherent data may be used to resolve the 1 MHz pulse coherent ambiguities.

The maximum depth for using the 1 MHz pulse coherent signals is about 5 meters. In water having depths greater than about 5 meters, the ambiguity velocity drops to as less than 0.1 m/s because of the increased lag time. When the ambiguity velocity is so low, small spikes in the ambiguity resolution data can cause errors when resolving ambiguities for some cells. Application of a filter to the ambiguity resolution data prior to resolving ambiguities reduces these errors. In exemplary embodiments, a Gaussian filter with a standard deviation of 1 is used. Filtering of the ambiguity resolution data advantageously expands the range over which pulse coherent data can be used.

The following are exemplary configurations of the system and method described herein. The features discussed in each example may be achieved independently or in combination in various embodiments and aspects that will not be specifically discussed, and in more complex combinations that will not be specifically discussed, but which are expressly contemplated by this disclosure.

5-Beam Transducer System

Figure 3:
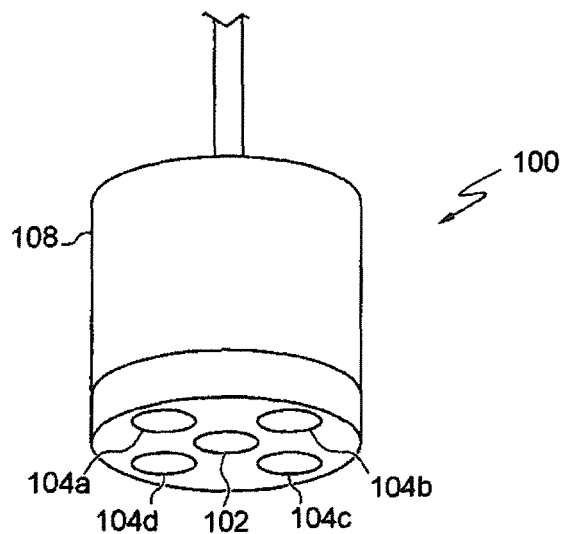
FIG. 3 is an illustration of a 5-beam transducer system employing a 4-beam multi-element transducer array and a single beam transducer in one aspect of the system and method.

Referring now to FIG. 3, a graphical representation of a 5-beam transducer system 100 is presented. The 5-beam transducer system 100 comprises a central beam transducer 102 (similar to transducer 12*a*, as discussed above) mounted in a housing 108, and a multi-element transducer array 104 including four profile beam transducers 104a, 104b, 104c, and 104d (similar to transducers 11a, 11b, 11c, and 11d, as discussed above) mounted around the central beam transducer 102. In one aspect, the four profile beam transducers are each mounted facing outwardly at about a 25 degree angle from the facing of the central beam transducer 102, and radially distributed around the central beam transducer 102 at an equal interval, so as to bound a volume of the aquatic environment that is generally pyramidal in shape and that is angularly coincident with the volume of the aquatic environment within the central beam. In the illustrated aspect, each profile beam transducer 104a, 104b, 104c, and 104d, is mounted 90 degrees from the adjacent profile beam transducers with respect to the central beam transducer 102, however those of skill will appreciate that as few as three or more than four profile beam transducers may be used for velocity profiling applications. As described above, the multi-element transducer array 104 may be connected to a first acoustic transceiver 21, and the vertical beam transducer 102 may be connected to a second acoustic transceiver 22.

The vertical beam transducer 102 can be operated at lower frequencies in the range of about 100 KHz to 1 MHz and is typically operated as a depth measuring device, but may optionally be operated as an additional Doppler measuring device in order to provide central velocity and acoustic backscattering strength data. In one aspect, the vertical beam transducer 102 is a 10 mm acoustic element operating at a frequency of 1 MHz. The multi-beam transducer array 104 can be operated at frequencies in the range of about 100 KHz to about 5 MHz. In one aspect, the multi-beam transducer array 104 includes four 20 mm acoustic Doppler elements operating at a frequency of 3 MHz. The multi-beam transducer array 104 may be used to perform velocity profiling, position tracking (i.e., determining the speed of the acoustic sensor platform relative to an object in the aquatic environment, particularly the bed of a body water or an ice pack over deep water), and/or wave-field analysis, as well as to estimate a depth or altitude, as variously known in the art. Further description of operations in a rivirine discharge analysis application is provided in the specification attached in Appendix A, but it will be recognized that the device described therein may also be used to collect alternate types of data in alternate applications as described herein.

9-Beam Transducer System

Figure 4:
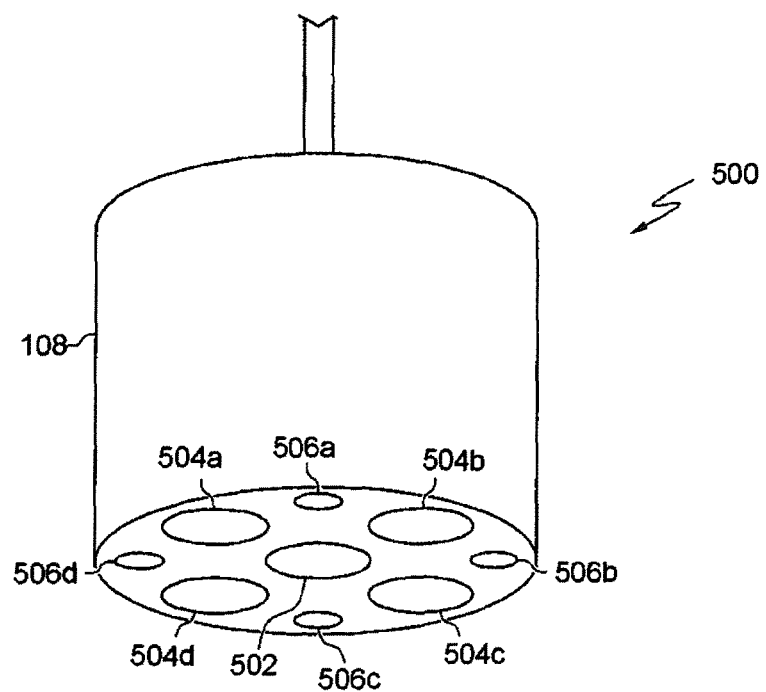
FIG. 4 is an illustration of a 9-beam transducer system employing a first 4-beam multi-element transducer array, and second 4-beam multi-element transducer array, and a single beam transducer in one aspect of the system and method.

Referring now to FIG. 4, a graphical representation of a 9-beam transducer system 500 is presented. The 9-beam transducer system 500 comprises a low frequency central beam transducer 502 (similar to transducer 12a, as discussed above) mounted in a housing 108, a multi-element transducer array 504 of four mid-frequency profile beam transducers 504a, 504b, 504c, and 504d (similar to transducers 13a, 13b, 13c, and 13d, as discussed above) mounted around the low frequency central beam transducer 502, and a multi-element transducer array 506 of four high frequency profile beam transducers 506a, 506b, 506c, and 506d (similar to transducers 11a, 11b, 11c, and 11d, as discussed above) mounted around the low frequency central beam transducer 502. In one aspect, the four mid-frequency profile beam transducers are each mounted facing outwards at about a 25 degree angle from the facing of the central beam transducer 502, and radially distributed around the central beam transducer 502 at an equal interval so as to bound a volume of the aquatic environment that is roughly pyramidal in shape. The four high-frequency profile beam transducers are each mounted facing outwards at about a 25 degree angle from the facing of the central beam transducer 502, and radially interspersed among the mid-frequency profile beam transducers at an equal interval so as to bound a volume of the aquatic environment that is also generally pyramidal in shape and angularly coincident with the volume of the aquatic environment within mid-frequency beams. Both such volumes are angularly coincident with the volume of the aquatic environment within the central beam. Those of skill will appreciate that as few as three or more than four profile beam transducers operating at each frequency may be used for velocity profiling applications. As described above, the multi-element transducer array 506 may be connected to a first acoustic transceiver 21, the central beam transducer 502 may be connected to a second acoustic transceiver 22, and the multi-element transducer array 504 may be connected to a third acoustic transceiver 23.

In one embodiment, the vertical beam transducer 102 is a 30 mm acoustic element operating at a frequency of 0.5 MHz, the multi-beam transducer array 506 includes four 20 mm acoustic Doppler elements operating at a frequency of 3 MHz, and the multi-beam transducer array 504 includes four 30 mm acoustic Doppler elements operating at a frequency of 1 MHz. In operation, the mid-frequency multi-element transducer array 504 may be used to permit measurement over an extended range in comparison to the high-frequency multi-element transducer array 506, however in other aspects the multi-element transducer array 504 may be operated at other acoustic frequencies and used to permit position tracking in other aquatic environments, such as over rocky beds or under ice packs, or used to permit measurements to be taken in different water quality conditions, such as generally clear versus muddy water. Further description of operations in a rivirine discharge analysis application is provided in the specification attached in Appendix A, but it will be recognized that the device described therein may also be used to collect alternate types of data in alternate applications as described herein.

6-Beam Transducer System

Figure 5:
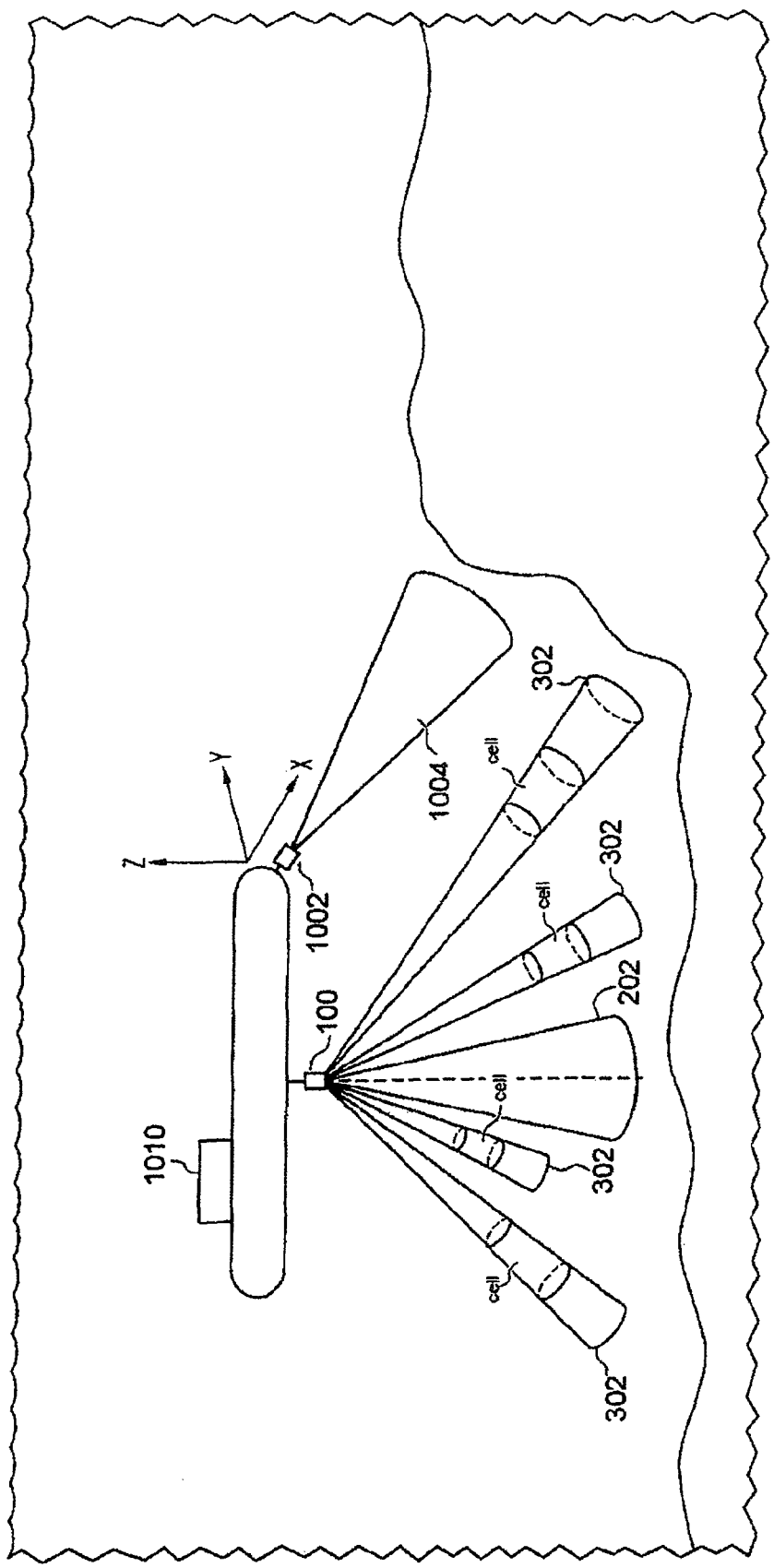
FIG. 5 is an illustration of an additional forward-looking single beam transducer employed in a velocity profiling application.

Referring now to FIG. 5, a graphical representation of a 6-beam transducer system 1000 is presented. The system may employ the exemplary 5-beam transducer system 100 described above, but add a transducer 1002 (similar to transducer 15a, as discussed above) or navigational obstacle avoidance proximate the bow of an aquatic sensor platform 1010 that may be an autonomous or remotely operated vehicle. As shown in the figure, the vehicle may be a submersible or underwater vehicle, but could also be a surface vehicle provided with a sensor to ensure that there is sufficient draft in the direction of travel. The volume of the aquatic environment sampled by the transducer 1002, i.e., within beam 1004, is angularly non-coincident with, or essentially distinct from, the volume of the aquatic environment sampled by the multi-element transducer array 104, i.e., within and between beams 302, as well as that of the vertical beam 102, i.e., within beam 202. However, because the vertical beam transducer 102 and the transducer 1002 may operate at the same acoustic frequency, control of the two transducers through acoustic sub-system controller 30 and main processing unit 35 permits pings from the two transducers to be interleaved more closely together without having to take into account assumed delays, or wait cycles, that would be used in independent acoustic systems to prevent mutual interference. Transducers 102 and 1002 may be operatively connected to separate acoustic transceivers, e.g., first and second instances of transceiver 22, so that beam 202 and beam 1004 may be operated independently of each other.

Although a single transducer 1002 has been discussed and shown, it will be appreciated that multiple transducers or a multi-element array of transducers, e.g., a linear array of transducers such as transducers 15a, 15b, and 15c, as discussed above, may be used to obtain navigational information from an array of bearings with respect to the direction of travel of the aquatic sensor platform 1010. Thus, two, three, or even more sensors may be employed into order to allow for navigational obstacle avoidance without the need to adjust course in order to survey areas outside of the volume sampled by transducer 1002.

7-Beam Transducer System

Figure 6:
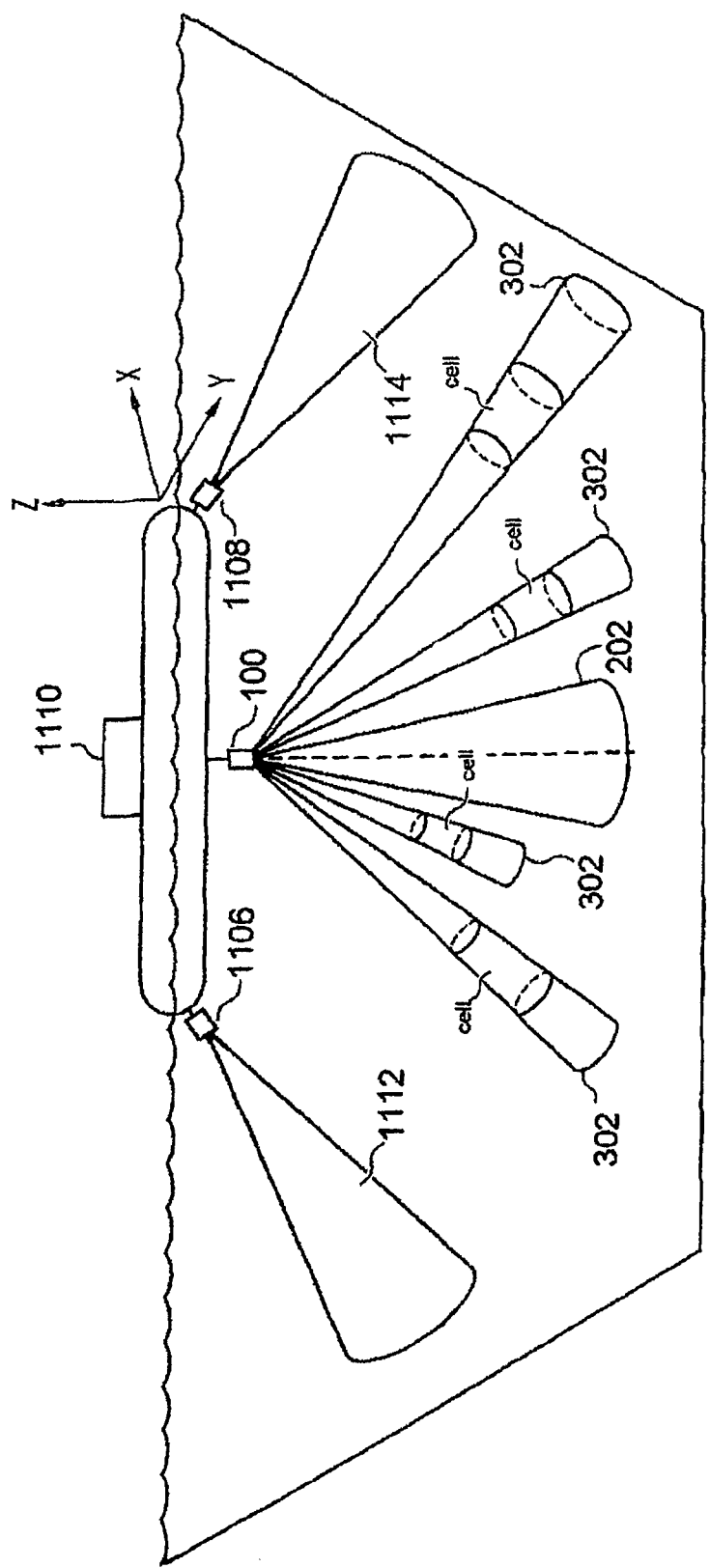
FIG. 6 is an illustration two additional side-looking single beam transducers employed in a velocity profiling application.

Referring now to FIG. 6, a graphical representation of a 7-beam transducer system 1100 is presented. The system may employ the exemplary 5-beam transducer system 100 described above, but add transducers 1106 and 1108 proximate the port and starboard sides of an aquatic sensor platform 1110 for navigational obstacle avoidance, station keeping, or mapping purposes. The acoustic sensor platform 1110 may be an autonomous or remotely operated vehicle, or may be a towed sensor platform. As shown in the figure, the vehicle may be a surface-going sensor platform, but may alternately be a submersible or underwater sensor platform depending upon the particular application. The volumes of the aquatic environment sampled by the transducers 1106 and 1108, i.e., within beams 1112 and 1114, respectively, are angularly non-coincident with, or essentially distinct from, the volume of the aquatic environment sampled by the multi-element transducer array 104, i.e., within and between beams 302, as well as that of the central beam 102, i.e., within beam 202. The volumes of the aquatic environment sampled by the transducers 1106 and 1108 are also angularly non-coincident with each other. Transducers 1106 and 1108 are preferably operatively connected to separate acoustic transceivers, e.g., additional instances of transceiver 22, so that beam 202 and beams 1112 and 1114 may be operated independently of each other, although it will be appreciated that transducers 1106 and 1108 need not be operated at the same acoustic frequency as transducer 102.

Transducers 1106 and 1108 are shown in an orientation which may be suited for station keeping within a canal or similar channel, where it may be a goal to maintain position relative to the banks of the body of water in order to collect data which is coherent along the predominant direction of flow. However, transducers 1106 and 1108 may be instead oriented at any angle from the horizontal in a side-looking mapping application, or additionally angled toward the bow of the aquatic sensor platform 1110 in a navigational obstacle avoidance application as discussed in the context of the prior example. As before, since the vertical beam transducer 102 and the transducers 1106 and 1108 may operate at the same acoustic frequency, control of these transducers through acoustic subsystem controller 30 and main processing unit 35 permits pings from the transducers to be interleaved more closely together without having to take into account assumed delays, or wait cycles, that would be used in independent acoustic systems to prevent mutual interference.

Although a two transducers 1106 and 1108 have been discussed and shown, it will be appreciated that multiple transducers or a multi-element array of transducers, e.g., a linear array, may be sideways-looking in order to obtain navigational information from an array of bearings with respect potential directions of travel and/or drift of the aquatic sensor platform 1110. Thus, more sensors may be employed into order to allow for navigational obstacle avoidance when maneuvering with thrusters, reversing a direction of travel, etc. during operations within natural and manmade aquatic environments.

10-Beam Transducer System

Figure 7:
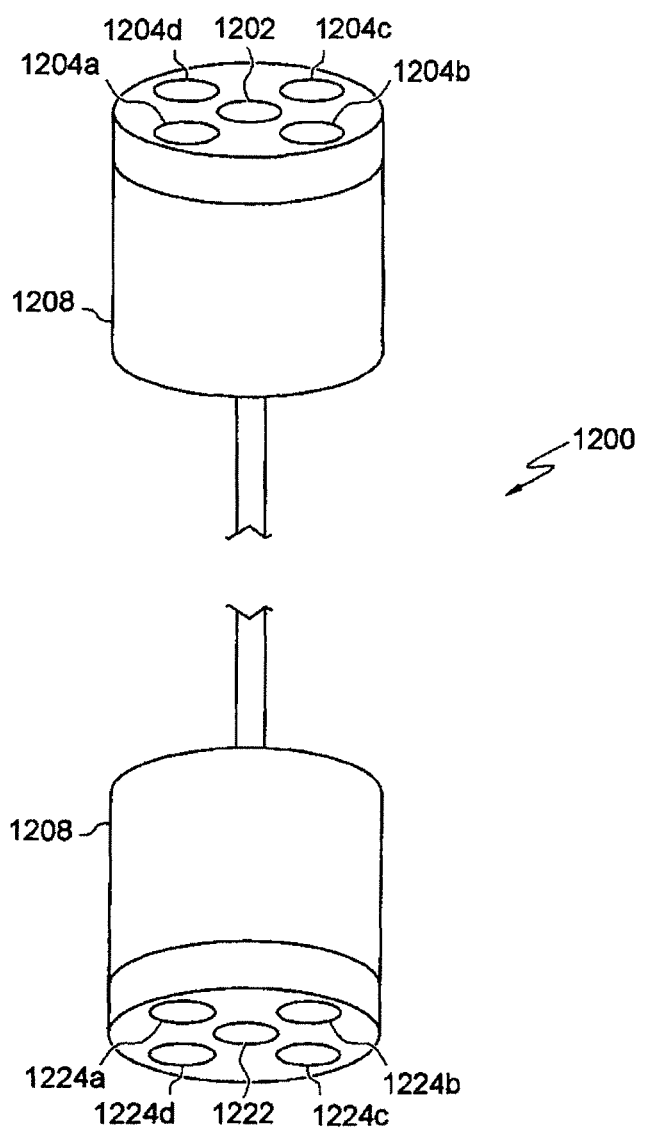
FIG. 7 is an illustration of a 10-beam transducer system employing an upwardly oriented 4-beam multi-element transducer array/single beam transducer sensor group and a downwardly oriented 4-beam multi-element transducer array/single beam transducer sensor group in one aspect of the system and method.
Figure 8:
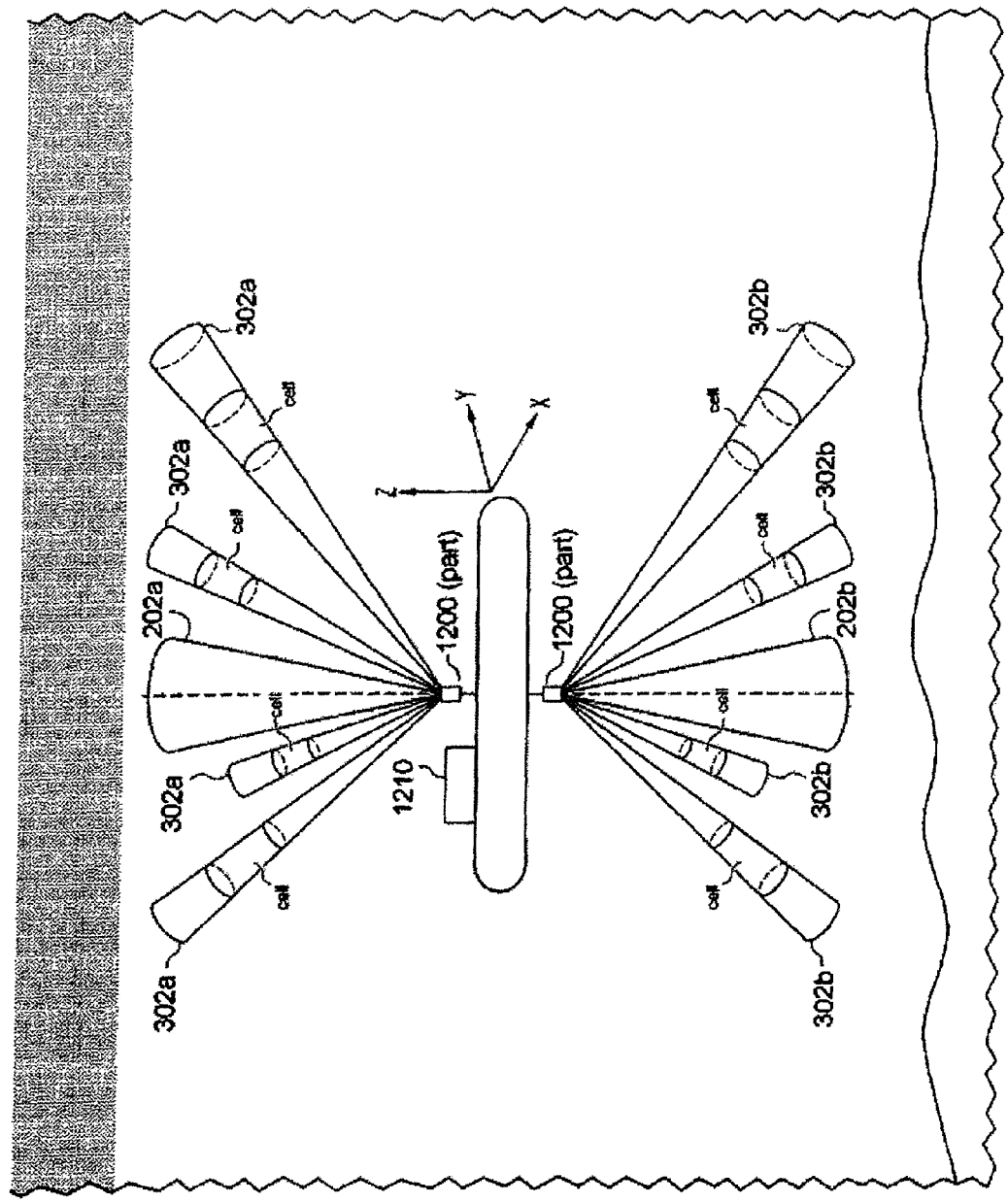
FIG. 8 is an illustration of an application where the acoustic sensor platform is a submersible vehicle, and two generally oppositely directed multi-element transducer arrays are employed in a velocity profiling application.

Referring now to FIGS. 7 and 8, a graphical representation of a 10-beam transducer system 1200 is presented. The 10-beam transducer system 1200 may generally comprise central beam transducers 1202 and 1222 each mounted in a housing 1208, and multi-element transducer arrays 1204 and 1224 each including four profile beam transducers 1204a-d and 1224a-d mounted around the respective central beam transducers 1202 and 1222. In one aspect, the four profile beam transducers are each mounted facing outwards at about a 25 degree angle from the respective central beam transducer, and radially distributed around the that central beam transducer at an equal interval, so as to bound a volume of the aquatic environment that is generally pyramidal in shape, i.e., within and between beams 302a or 302b, respectively, and angularly coincident with the volume of the aquatic environment within the central beam, i.e., within beam 202a or 202b, respectively. As illustrated, the central beam transducer 1202 may be upward facing, with the multi-element transducer array 1204 being generally upward facing, and the central beam transducer 1222 may be downward facing, with the multi-element transducer array 1224 being generally downward facing. Those of skill will appreciate that as few as three or more than four profile beam transducers may be used for velocity profiling applications, that the central beam transducers 1202 and 1222 are not required elements of the sensor groups, and the sensor groups are not required to be oppositely facing. As described above, the multi-element transducer arrays 1204 and 1224 may be connected to a first acoustic transceiver 21, and the central beam transducers 1202 and 1222 may be connected to a second acoustic transceiver 22. However, the multi-element transducer arrays 1204 and 1224 may be connected to separate acoustic transceivers 21 and 21a (essentially duplicating 21 but not shown), and central beam transducers 1202 and 1222 may be connected to separate acoustic transceivers 22 and 22a (essentially duplicating 22 but not shown), in order to allow for reuse of acoustic transceiver electronics developed for other aspects such as the 5-beam transducer system described above. In addition, it will be apparent that housing 1208 may be one housing, two separate housings, or merely a particularly configured section of the hull of an aquatic sensor platform 1210, depending upon the desired orientations of the respective transducer subgroups 1202/1204 and 1222/1224 and the configuration of the aquatic sensor platform 1210.

The central beam transducers 1202 and 1222 can be operated at frequencies in the range of about 100 KHz to 1 MHz and are typically operated as depth and altimetry measuring devices, but may optionally be operated as additional Doppler measuring devices in order to provide additional central velocity and acoustic backscattering strength data. In one aspect, the central beam transducers 1202 and 1222 may be 30 mm acoustic elements operating at a frequency of 0.5 MHz. The multi-beam transducer arrays 1204 and 1224 can be operated at frequencies in the range of about 100 KHz to about 5 MHz. In one aspect, the multi-beam transducer arrays 1204 and 1224 may each include four 20 mm acoustic Doppler elements operating at a frequency of 3 MHz. In another aspect, the multi-beam transducer arrays 1204 and 1224 may each include four 30 mm acoustic Doppler elements operating at a frequency of 1 MHz. The multi-beam transducer arrays may be used to perform velocity profiling, position tracking (i.e., determining the speed of the acoustic sensor platform relative to an object in the aquatic environment, particularly a bed and overlying ice pack in shallow water), and analysis of the motion between objects in the aquatic environment.

In variations of this example, the multi-beam transducer arrays 1204 and 1224 may operate at different acoustic frequencies. For example, in a submersible aquatic sensor platform 1210, the multi-beam transducer array 1204 may include four 30 mm acoustic Doppler elements operating at a frequency of 1 MHz for the purpose of obtaining velocity profile and wave-field analysis data, but the multi-beam transducer array 1224 may include four 20 mm acoustic Doppler elements operating at a frequency of 3 MHz for the purpose of obtaining velocity profile and sediment transport analysis data. In such an application, the aquatic sensor platform 1210 may station keep, rest, or even be temporarily anchored in the sediment bed, and the multi-beam transducer array 1224 may itself be used to measure and/or estimate altimetry (through independent measurements of altitude with respect to each angled beam and/or an estimate of a central value derived from the independent measurements), so that central transducer 1222 is optional and may be omitted.

Other Transducer Systems

Various applications may substitute a 4-beam transducer system lacking a central beam transducer, a 9-beam transducer system including a second multi-element transducer array, or other suggested variants may be substituted for the 5-beam transducer system/sensor group and 4-element multi-element transducer array used as a common basis for description and explanation in the aforedescribed exemplary applications. Those of skill will appreciate that a reasonably arbitrary number of transducers and/or multi-element transducer arrays, driven by a plurality of acoustic transceivers collectively operating at a plurality of different acoustic frequencies, and operatively connected through a common acoustic subsystem controller to a common main processing unit, may be more usefully employed in order to gather data from essentially distinct volumes of the aquatic environment oriented around an aquatic sensor platform, depending upon the needs of the particular application.

The acoustic Doppler systems and embodiments discussed herein may be employed in a variety of applications. An exemplary application, the measurement and estimation of the discharge of a river or other moving body of water, is specifically discussed in the parent of this application, U.S. application Ser. No. 12/340,315, the disclosure of which is incorporated by reference. Those of skill in the art will appreciate that the systems and methods described herein may, as mentioned above, be used to obtain velocity profiles within a variety of environments such as a canal, river, narrows, bay, or open water; with a variety of orientations such as downward-facing, upward facing, and horizontally facing; and on a variety of acoustic sensor platforms, whether fixed or mobile, in order to obtain velocity profile information.

The embodiments of the invention shown in the drawings and described above are exemplary of numerous embodiments that may be made within the scope of the appended claims. It is contemplated that numerous other configurations of the system and method, and other applications of the device employing various combinations and orientations of transducers and multi-element transducer arrays, may be created based on recombinations of the disclosed approach and examples. It is the applicant's intention that the scope of the patent issuing herefrom will be limited only by the scope of the claims.

What is claimed is:

1. An acoustic Doppler system comprising:
a plurality of acoustic transceivers;
a first of the plurality of acoustic transceivers operating at a first acoustic frequency and being operatively connected to a first group of transducers producing an acoustic signal;
a second of the plurality of acoustic transceivers operating at a second acoustic frequency and being operatively connected to a second group of transducers producing an acoustic signal;
the first and second acoustic transceivers adapted to operate concurrently at the first and second acoustic frequencies;
an acoustic subsystem controller operatively connected to the first and second acoustic transceivers, the acoustic subsystem controller controlling the acoustic signals produced by the first and second group of transducers; and
a main processing unit operatively connected to the acoustic subsystem controller, the main processing unit being adapted to execute instructions to the first and second group of transducers to produce acoustic signals having at least two frequencies and being adapted to run at least two Doppler signal processing methods concurrently;
the main processing unit analyzing data received by the first and second group of transducers, automatically adjusting the acoustic frequencies of the acoustic signals produced by the first and second group of transducers, and automatically selecting a method of processing the data received by the first and second group of transducers.

2. The system of claim 1 wherein the method of processing is selected from the group consisting of: incoherent processing, pulse coherent processing and broadband processing.

3. The system of claim 1 wherein the first group of transducers includes at least one profile transducer producing an acoustic signal and wherein a Doppler frequency shift corresponding to the velocity of a volume of water relative to the profile transducer is derived from a returned profile echo from the volume of water.

4. The system of claim 3 wherein the data analyzed by the main processing unit comprises the returned profile echo and the derived Doppler frequency shift.

5. The system of claim 3 wherein the acoustic signal produced by the at least one profile transducer has a frequency selected from the range of approximately 100 KHz to approximately 5 MHz.

6. The system of claim 1 wherein the second group of transducers includes at least one depth transducer producing an acoustic signal and wherein a depth corresponding to the distance between the depth transducer and a bottom of a body of water is derived from a returned depth echo from the bottom of the body of water.

7. The system of claim 6 wherein the data analyzed by the main processing unit comprises the returned depth echo and the depth.

8. The system of claim 6 wherein the acoustic signal produced by the at least one depth transducer has a frequency selected from the range of approximately 100 KHz to approximately 5 MHz.

9. The system of claim 1 wherein the main processing unit is adapted to selectively operate each acoustic transceiver in the plurality of acoustic transceivers independently of the others of the plurality of acoustic transceivers.

10. The system of claim 9 wherein the main processing unit is adapted to selectively operate each acoustic transceiver in the plurality of acoustic transceivers one at a time, in groups and simultaneously.

11. The system of claim 1 wherein the main processing unit resolves ambiguities in the received data to optimize acoustic frequencies of the acoustic signals produced by the first and second group of transducers.

12. A method of determining the flow of water, comprising:
executing instructions to concurrently produce at least two acoustic signals having at least two frequencies;
concurrently producing a first acoustic signal of a first frequency and a second acoustic signal of a second frequency;
receiving data in response to one or both of the first and second acoustic signals;
analyzing the received data;
automatically adjusting the acoustic frequencies of the one or both of the first and second acoustic signals;
automatically selecting a method of processing the received data, the method of processing selected from the group consisting of: incoherent processing, pulse coherent processing and broadband processing; and
running at least two processing methods concurrently.

13. The method of claim 12 wherein the first acoustic signal has a profile beam of a profile frequency and wherein the data received in response to the first acoustic signal is a Doppler frequency shift corresponding to the velocity of a volume of water derived from a returned profile echo from the volume of water.

14. The method of claim 13 wherein the data analyzed comprises the returned profile echo and the derived Doppler frequency shift.

15. The method of claim 13 wherein the acoustic signal produced has a profile frequency selected from the range of approximately 100 KHz to approximately 5 MHz.

16. The method of claim 12 wherein the second acoustic signal has a depth beam of a depth frequency and wherein a depth corresponding to the distance between the depth transducer and a bottom of a body of water is derived from a returned depth echo from the bottom of the body of water.

17. The method of claim 16 wherein the data analyzed comprises the returned depth echo and the depth.

18. The method of claim 16 wherein the acoustic signal produced has a depth frequency selected from the range of approximately 100 KHz to approximately 5 MHz.

19. A control system for an acoustic Doppler system, comprising:
a processing unit controlling acoustic signals produced by an acoustic Doppler system;
the processing unit being adapted to execute instructions to produce acoustic signals having at least two frequencies and being adapted to run at least two processing methods concurrently;
the processing unit analyzing data received by the acoustic Doppler system, automatically adjusting the acoustic frequencies of the acoustic signals produced by the acoustic Doppler system, and automatically selecting a method of Doppler signal processing the data received by the acoustic Doppler system.

20. The control system of claim 19 wherein the method of processing is selected from the group consisting of: incoherent processing, pulse coherent processing and broadband processing.

21. The control system of claim 20, further comprising:
a plurality of acoustic transceivers, a first of the plurality of acoustic transceivers operating at a first acoustic frequency and being operatively connected to a first group of transducers producing an acoustic signal;
a second of the plurality of acoustic transceivers operating at a second acoustic frequency and being operatively connected to a second group of transducers producing an acoustic signal;
the first and second acoustic transceivers adapted to operate concurrently at the first and second acoustic frequencies and being operatively connected to the processing unit.

* * * * *